United States Patent [19]

Matsuzawa et al.

[11] Patent Number: 5,898,430
[45] Date of Patent: Apr. 27, 1999

[54] SCENARIO EDITOR FOR MULTIMEDIA DATA AND SCENARIO REPRODUCING APPARATUS

[75] Inventors: Tomoko Matsuzawa, Tokyo; Akihiko Minagawa, Fukaya, both of Japan

[73] Assignee: Matsushita Electric Industrial Co., Ltd., Osaka, Japan

[21] Appl. No.: 08/678,203

[22] Filed: Jul. 11, 1996

[30] Foreign Application Priority Data

| Jul. 11, 1995 | [JP] | Japan | 5-174663 |
| Nov. 1, 1995 | [JP] | Japan | 7-306373 |
| Nov. 2, 1995 | [JP] | Japan | 7-285550 |

[51] Int. Cl.$^6$ .................................................. G06T 1/00
[52] U.S. Cl. .......................................................... 345/302
[58] Field of Search ............................................ 345/302

[56] References Cited

U.S. PATENT DOCUMENTS

| 5,047,868 | 9/1991 | Takeda et al. | 358/335 |
| 5,481,664 | 1/1996 | Hiroya et al. | 395/154 |
| 5,564,005 | 10/1996 | Weber et al. | 396/161 |
| 5,577,185 | 11/1996 | Tunnell et al. | 395/173 |
| 5,613,909 | 3/1997 | Stelovsky | 463/1 |
| 5,642,286 | 6/1997 | Yamada et al. | 364/468.03 |
| 5,659,793 | 8/1997 | Escobar et al. | 395/807 |
| 5,666,554 | 9/1997 | Tanaka | 395/806 |

FOREIGN PATENT DOCUMENTS

| 0239884 | 10/1987 | European Pat. Off. . |
| 0522645 | 1/1993 | European Pat. Off. . |
| 0627690 | 12/1994 | European Pat. Off. . |
| 0631246 | 12/1994 | European Pat. Off. . |
| 0645721 | 3/1995 | European Pat. Off. . |
| 6119229 | 4/1994 | Japan . |

OTHER PUBLICATIONS

Computer Communications, vol. 15, No. 10, Dec. 1, 1992, pp. 611–618, XP000321682, Blakowski G. et al: "Tool Support for the Synchronization and Presentation of Distributed Multimedia".

Proceedings of the International Conference on Distributed Computing Systems, Yokohama, Jun. 9–12, 1992, No. Conf. 12, Jun. 9, 1992, Institute of Electrical and Electronics Engineers, 90–97, XP000341001, Takeshi Yoneda et al: "A New Communication Tool: Time Dependent Multimedia Document".

IEEE Computer Graphics and Applications, vol. 11, No. 4, Jul. 1, 1991, pp. 58–66, XP000384418, Pea R.D. "Learning Through Multimedia".

"Composition and Search with a Video Algebra" by Weiss et al, from IEEE Multimedia, vol. 2, No. 1, Spring 1995 pp. 12–25.

*Primary Examiner*—Joseph H. Feild
*Assistant Examiner*—Alford W. Kindred
*Attorney, Agent, or Firm*—Lowe Hauptman Gopstein Gilman & Berner

[57] ABSTRACT

A plurality of individual objects is put together to a group of page type objects in a page type object producing unit. When a display timing and a deletion timing for the group of page type objects are input, a page change timing of each of the page type objects in the group is automatically set in a page change timing setting unit to display the page type objects with a dynamic image at equal intervals in a display period between the display timing and the deletion timing. Therefore, it is not required to input a display timing and a deletion timing for each of the individual objects for the purpose of editing a scenario in which the individual objects are assigned to frames of dynamic image to display the individual objects with the dynamic image, and a scenario editing operation can be easily performed.

16 Claims, 39 Drawing Sheets

FIG. 3

| DYNAMIC IMAGE MANAGEMENT IDENTIFICATION NUMBER | DYNAMIC IMAGE OBJECT NAME |
|---|---|
| DYNAMIC IMAGE 0001 | FIRST DYNAMIC IMAGE |
| DYNAMIC IMAGE 0002 | SECOND DYNAMIC IMAGE |
| DYNAMIC IMAGE 0003 | THIRD DYNAMIC IMAGE |

| INDIVIDUAL OBJECT MANAGEMENT IDENTIFICATION NUMBER | INDIVIDUAL OBJECT NAME |
|---|---|
| STATIC IMAGE 0001 | FIRST STATIC IMAGE |
| STATIC IMAGE 0002 | SECOND STATIC IMAGE |
| STATIC IMAGE 0003 | THIRD STATIC IMAGE |

| INDIVIDUAL OBJECT MANAGEMENT IDENTIFICATION NUMBER | INDIVIDUAL OBJECT NAME |
|---|---|
| TEXT 0001 | FIRST TEXT |
| TEXT 0002 | SECOND TEXT |
| TEXT 0003 | THIRD TEXT |

FIG. 4

[ATTRIBUTE INFORMATION]   STATIC IMAGE

[PAGE NUMBER]   20

[PAGE INFORMATION]
    FIRST STATIC IMAGE
    SECOND STATIC IMAGE
    ⋮
    TWENTIETH STATIC IMAGE

[ATTRIBUTE INFORMATION]   TEXT

[PAGE NUMBER]   10

[PAGE INFORMATION]
    FIRST TEXT
    SECOND TEXT
    ⋮
    TENTH TEXT

FIG. 5
| PAGE TYPE OBJECT MANAGEMENT IDENTIFICATION NUMBER | PAGE TYPE OBJECT NAME |
|---|---|
| PAGE TYPE OBJECT 0001 | FIRST PAGE TYPE OBJECT |
| PAGE TYPE OBJECT 0002 | SECOND PAGE TYPE OBJECT |
| PAGE TYPE OBJECT 0003 | THIRD PAGE TYPE OBJECT |
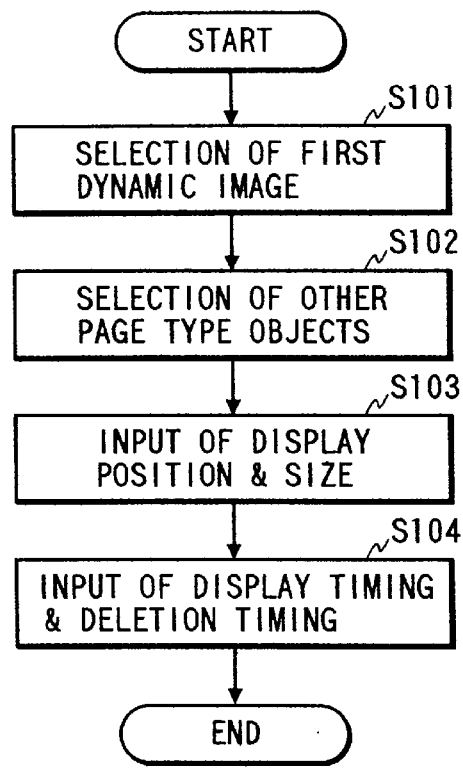
FIG. 7
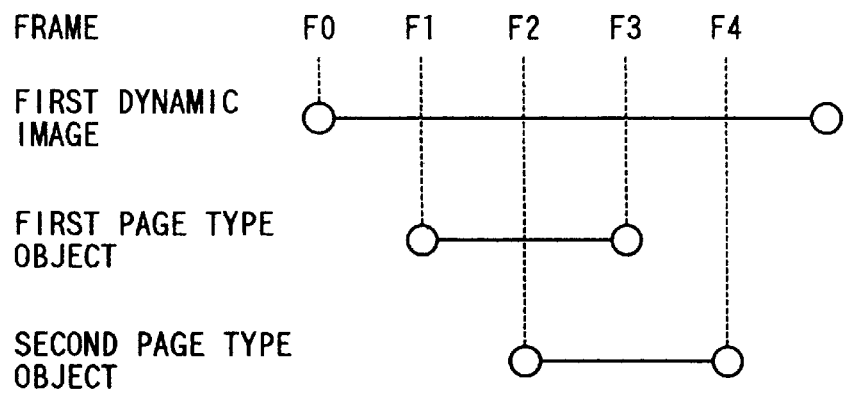
FIG. 6

FIG. 8A

| OBJECT IDENTIFICATION NUMBER | OBJECT NAME |
|---|---|
| 0001 | FIRST DYNAMIC IMAGE |
| 0002 | FIRST PAGE TYPE OBJECT |
| 0003 | SECOND PAGE TYPE OBJECT |

FIG. 8B

| FRAME | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| F1 | 0002 | 0 | STATIC IMAGE W001 | PAGE TYPE OBJECT |
| F2 | 0003 | 0 | TEXT W001 | PAGE TYPE OBJECT |
| F3 | 0002 | -1 | STATIC IMAGE W001 | PAGE TYPE OBJECT |
| F4 | 0003 | -1 | TEXT W001 | PAGE TYPE OBJECT |

FIG. 8C

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |
| TEXT W001 | TEXT | W3 | H3 | X3 | Y3 |

FIG. 10A

| OBJECT IDENTIFICATION NUMBER | OBJECT NAME |
|---|---|
| 0001 | FIRST DYNAMIC IMAGE |
| 0002 | FIRST STATIC IMAGE |
| ⋮ | ⋮ |
| 0021 | TWENTIETH STATIC IMAGE |
| 0022 | FIRST TEXT |
| ⋮ | ⋮ |
| 0031 | TENTH TEXT |

FIG. 10B

| FRAME | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| f1 | 0002 | 0 | STATIC IMAGE W001 | STATIC IMAGE |
| f2 | 0002 | -1 | STATIC IMAGE W001 | STATIC IMAGE |
| ⋮ | ⋮ | ⋮ | ⋮ | ⋮ |
| f59 | 0031 | 0 | TEXT W001 | TEXT |
| f60 | 0031 | -1 | TEXT W001 | TEXT |

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |
| TEXT W001 | TEXT | W3 | H3 | X3 | Y3 |

| OBJECT IDENTIFICATION NUMBER | OBJECT NAME |
|---|---|
| 0001 | FIRST DYNAMIC IMAGE |
| 0002 | FIRST STATIC IMAGE |
| ⋮ | ⋮ |
| 0006 | FIFTH STATIC IMAGE |
| ⋮ | ⋮ |
| 0021 | TWENTIETH STATIC IMAGE |

FIG. 19B

| FRAME | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| f1 | 0002 | 0 | STATIC IMAGE W001 | STATIC IMAGE |
| f2 | 0002 | -1 | STATIC IMAGE W001 | STATIC IMAGE |
| ⋮ | ⋮ | ⋮ | ⋮ | ⋮ |
| f9 | 0006 | 0 | STATIC IMAGE W001 | STATIC IMAGE |
| f10 | 0006 | -1 | STATIC IMAGE W001 | STATIC IMAGE |

FIG. 19C

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |

FIG. 20

[ATTRIBUTE INFORMATION]    STATIC IMAGE

[PAGE NUMBER]    15

[PAGE INFORMATION]
    SIXTH STATIC IMAGE
    SEVENTH STATIC IMAGE
    ⋮
    TWENTIETH STATIC IMAGE

FIG. 21A

| OBJECT IDENTIFICATION NUMBER | OBJECT NAME |
|---|---|
| 0001 | FIRST DYNAMIC IMAGE |
| 0002 | FIRST STATIC IMAGE |
| ⋮ | ⋮ |
| 0006 | FIFTH STATIC IMAGE |
| 0007 | THIRD PAGE TYPE OBJECT |

FIG. 21B

| FRAME | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| f1 | 0002 | 0 | STATIC IMAGE W001 | STATIC IMAGE |
| f2 | 0002 | -1 | STATIC IMAGE W001 | STATIC IMAGE |
| ⋮ | ⋮ | ⋮ | ⋮ | ⋮ |
| f9 | 0006 | 0 | STATIC IMAGE W001 | STATIC IMAGE |
| f10 | 0006 | -1 | STATIC IMAGE W001 | STATIC IMAGE |
| f11 | 0007 | 0 | STATIC IMAGE W001 | PAGE TYPE OBJECT |
| f12 | 0008 | -1 | STATIC IMAGE W001 | PAGE TYPE OBJECT |

FIG. 21C

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |

FIG. 25

| OBJECT IDENTIFICATION NUMBER | OBJECT NAME | WINDOW IDENTIFICATION NUMBER | ATTRIBUTE |
|---|---|---|---|
| 0001 | FIRST DYNAMIC IMAGE | DYNAMIC IMAGE W001 | DYNAMIC IMAGE |
| 0002 | FIRST STATIC IMAGE | STATIC IMAGE W001 | STATIC IMAGE |
| 0003 | FIRST TEXT | TEXT W001 | TEXT |

FIG. 26

| OBJECT IDENTIFICATION NUMBER | X COORDINATE | Y COORDINATE | WIDTH | HEIGHT |
|---|---|---|---|---|
| 0001 | X1 | Y1 | W1 | H1 |
| 0002 | X2 | Y2 | W2 | H2 |
| 0003 | X3 | Y3 | W3 | H3 |

FIG. 27

| OBJECT IDENTIFICATION NUMBER | DISPLAY FRAME | DELETION FRAME |
|---|---|---|
| 0002 | F1 | F3 |
| 0003 | F2 | F3 |

FIG. 28A

| TITLE NAME | OBJECT NUMBER | MESSAGE NUMBER | DYNAMIC IMAGE WINDOW NUMBER | STATIC IMAGE WINDOW NUMBER | TEXT WINDOW NUMBER |
|---|---|---|---|---|---|
| TITLE 1 | 3 | 5 | 1 | 1 | 1 |

FIG. 28B

| OBJECT IDENTIFICATION NUMBER | 0001 | 0002 | 0003 |
|---|---|---|---|
| OBJECT NAME | FIRST DYNAMIC IMAGE | FIRST STATIC IMAGE | FIRST TEXT |

FIG. 28C

| TIMING | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| F1 | 0002 | 0 | STATIC IMAGE W001 | STATIC IMAGE |
| F2 | 0003 | 0 | TEXT W001 | TEXT |
| F3 | 0002 | -1 | STATIC IMAGE W001 | STATIC IMAGE |
| F3 | 0003 | -1 | TEXT W001 | TEXT |

FIG. 28D

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |
| TEXT W001 | TEXT | W3 | H3 | X3 | Y3 |

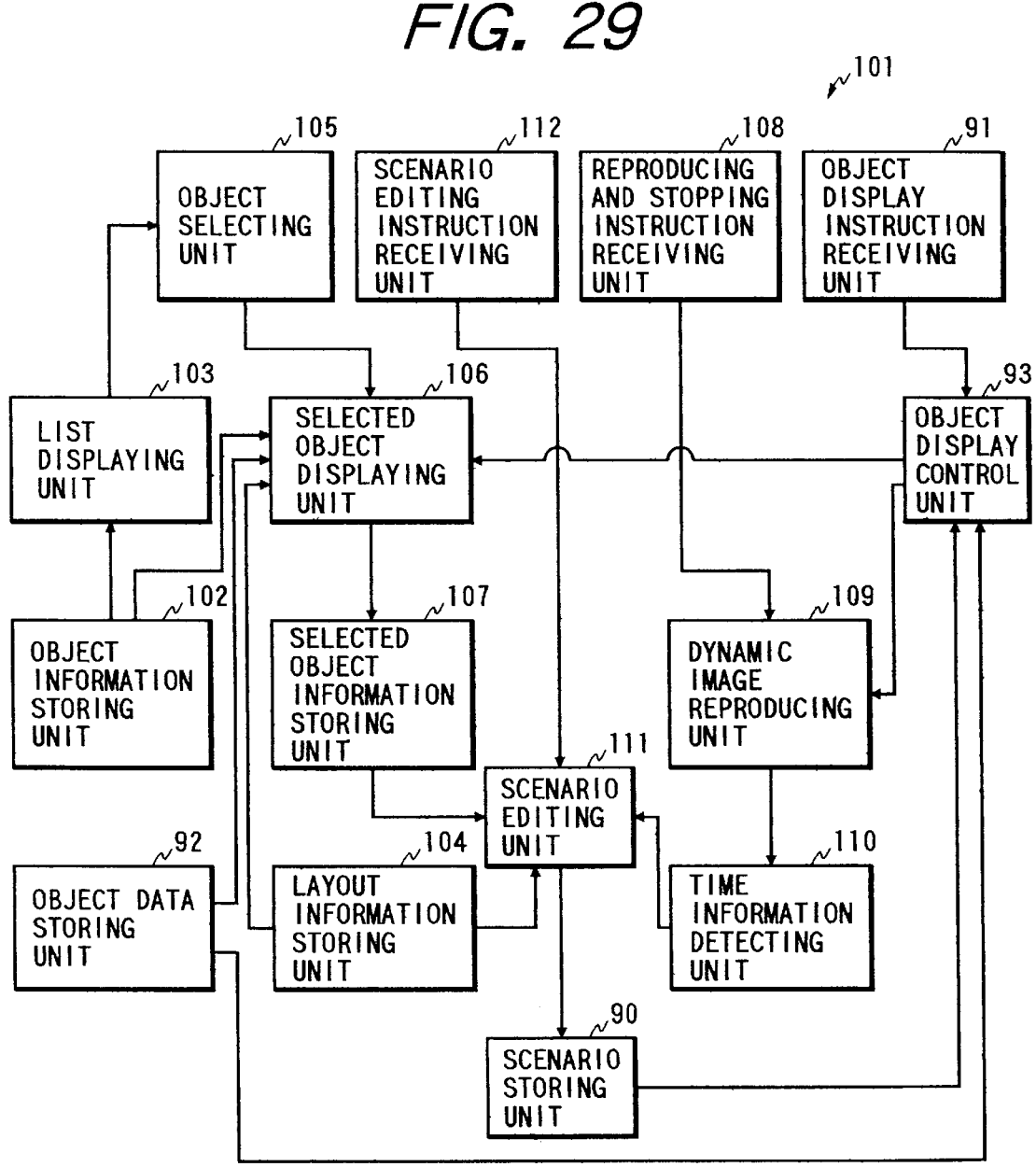

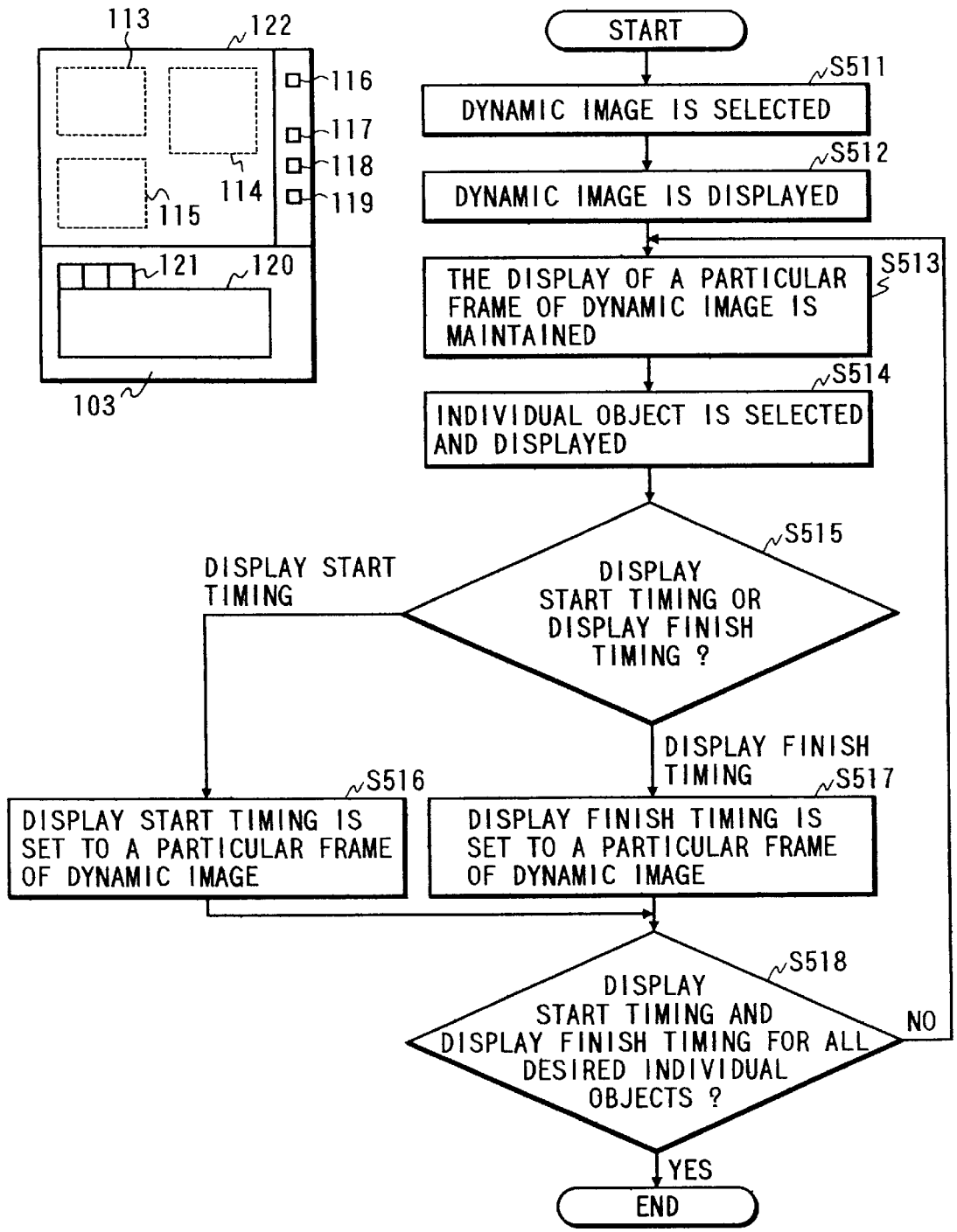

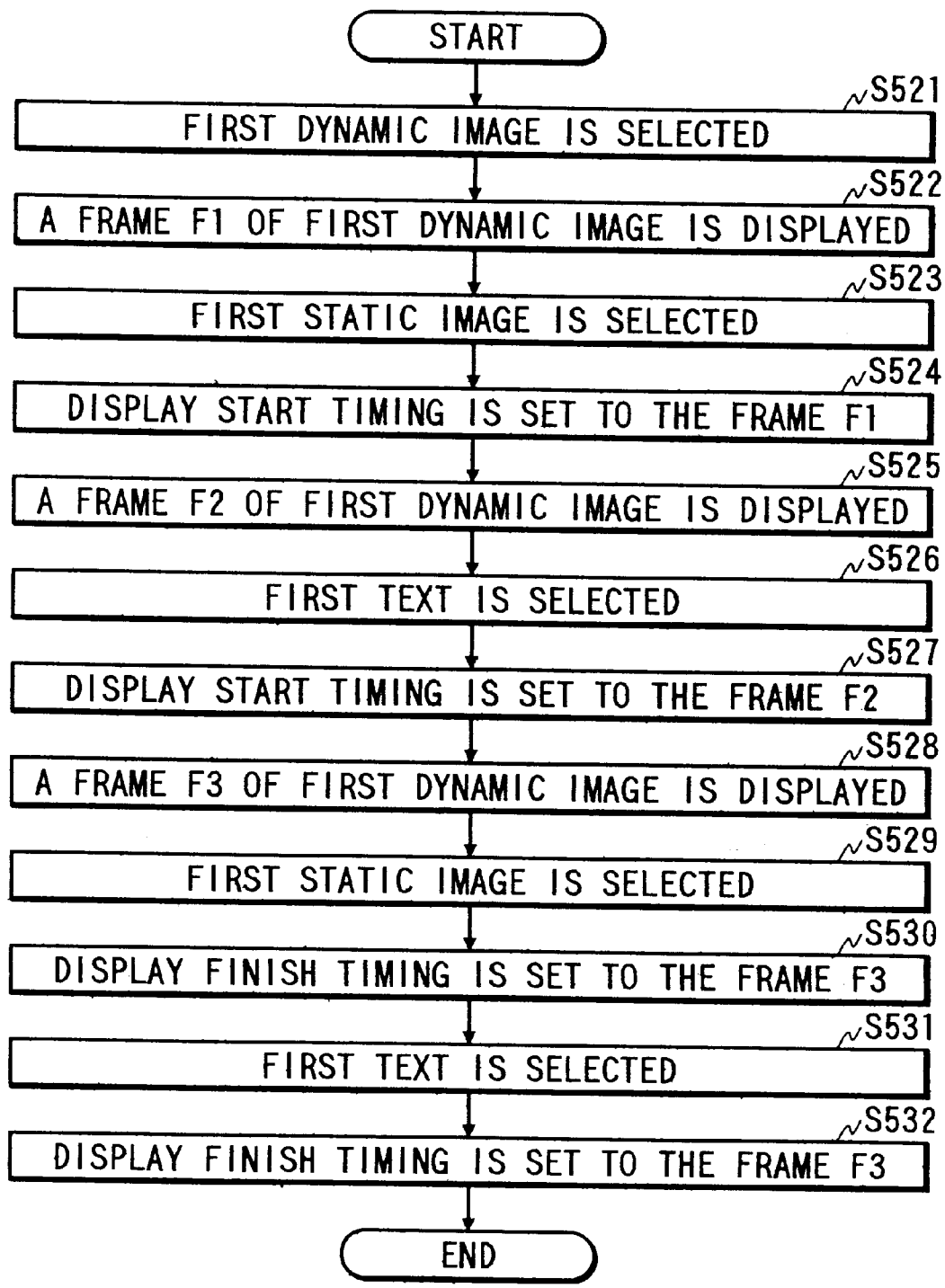

FIG. 34

| DYNAMIC IMAGE MANAGEMENT IDENTIFICATION NUMBER | DYNAMIC IMAGE OBJECT NAME |
|---|---|
| DYNAMIC IMAGE M001 | FIRST DYNAMIC IMAGE |
| DYNAMIC IMAGE M002 | SECOND DYNAMIC IMAGE |
| DYNAMIC IMAGE M003 | THIRD DYNAMIC IMAGE |
| DYNAMIC IMAGE M004 | FOURTH DYNAMIC IMAGE |
| DYNAMIC IMAGE M005 | FIFTH DYNAMIC IMAGE |

| STATIC IMAGE MANAGEMENT IDENTIFICATION NUMBER | STATIC IMAGE OBJECT NAME |
|---|---|
| STATIC IMAGE M001 | FIRST STATIC IMAGE |
| STATIC IMAGE M002 | SECOND STATIC IMAGE |
| STATIC IMAGE M003 | THIRD STATIC IMAGE |
| STATIC IMAGE M004 | FOURTH STATIC IMAGE |
| STATIC IMAGE M005 | FIFTH STATIC IMAGE |

| TEXT MANAGEMENT IDENTIFICATION NUMBER | TEXT OBJECT NAME |
|---|---|
| TEXT M001 | FIRST TEXT |
| TEXT M002 | SECOND TEXT |
| TEXT M003 | THIRD TEXT |
| TEXT M004 | FOURTH TEXT |
| TEXT M005 | FIFTH TEXT |

FIG. 35

| ATTRIBUTE | X COORDINATE | Y COORDINATE | WIDTH | HEIGHT |
|---|---|---|---|---|
| DYNAMIC IMAGE | X1 | Y1 | W1 | H1 |
| STATIC IMAGE | X2 | Y2 | W2 | H2 |
| TEXT | X3 | Y3 | W3 | H3 |

FIG. 36

| OBJECT IDENTIFICATION NUMBER | OBJECT NAME | WINDOW IDENTIFICATION NUMBER | ATTRIBUTE |
|---|---|---|---|
| 0001 | FIRST DYNAMIC IMAGE | DYNAMIC IMAGE W001 | DYNAMIC IMAGE |

| OBJECT IDENTIFICATION NUMBER | OBJECT NAME | WINDOW IDENTIFICATION NUMBER | ATTRIBUTE |
|---|---|---|---|
| 0001 | FIRST STATIC IMAGE | STATIC IMAGE W001 | STATIC IMAGE |

| OBJECT IDENTIFICATION NUMBER | OBJECT NAME | WINDOW IDENTIFICATION NUMBER | ATTRIBUTE |
|---|---|---|---|
| 0001 | FIRST TEXT | TEXT W001 | TEXT |

FIG. 38

| TITLE NAME | OBJECT NUMBER | MESSAGE NUMBER | DYNAMIC IMAGE WINDOW NUMBER | STATIC IMAGE WINDOW NUMBER | TEXT WINDOW NUMBER |
|---|---|---|---|---|---|
| TITLE 1 | 2 | 2 | 1 | 1 | 0 |

| OBJECT IDENTIFICATION NUMBER | 0001 | 0002 |
|---|---|---|
| OBJECT NAME | FIRST DYNAMIC IMAGE | FIRST STATIC IMAGE |

| TIMING | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| F1 | 0002 | 0 | STATIC IMAGE W001 | STATIC IMAGE |

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |

FIG. 39

| TITLE NAME | OBJECT NUMBER | MESSAGE NUMBER | DYNAMIC IMAGE WINDOW NUMBER | STATIC IMAGE WINDOW NUMBER | TEXT WINDOW NUMBER |
|---|---|---|---|---|---|
| TITLE 1 | 3 | 4 | 1 | 1 | 1 |

| OBJECT IDENTIFICATION NUMBER | 0001 | 0002 | 0003 |
|---|---|---|---|
| OBJECT NAME | FIRST DYNAMIC IMAGE | FIRST STATIC IMAGE | FIRST TEXT |

| TIMING | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| F1 | 0002 | 0 | STATIC IMAGE W001 | STATIC IMAGE |
| F2 | 0003 | 0 | TEXT W001 | TEXT |
| F3 | 0002 | -1 | STATIC IMAGE W001 | STATIC IMAGE |

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |
| TEXT W001 | TEXT | W3 | H3 | X3 | Y3 |

FIG. 42A

| WINDOW IDENTIFICATION NUMBER | OBJECT IDENTIFICATION NUMBER |
|---|---|
| STATIC IMAGE W001 | 0002 |

FIG. 42B

| WINDOW IDENTIFICATION NUMBER | OBJECT IDENTIFICATION NUMBER |
|---|---|
| STATIC IMAGE W001 | 0002 |
| TEXT W001 | 0003 |

FIG. 44

| TIMING | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| F1 | 0002 | 0 | STATIC IMAGE W001 | STATIC IMAGE |
| F2 | 0003 | 0 | TEXT W001 | TEXT |
| F5 | 0002 | -1 | STATIC IMAGE W001 | STATIC IMAGE |
| F3 | 0003 | -1 | TEXT W001 | TEXT |

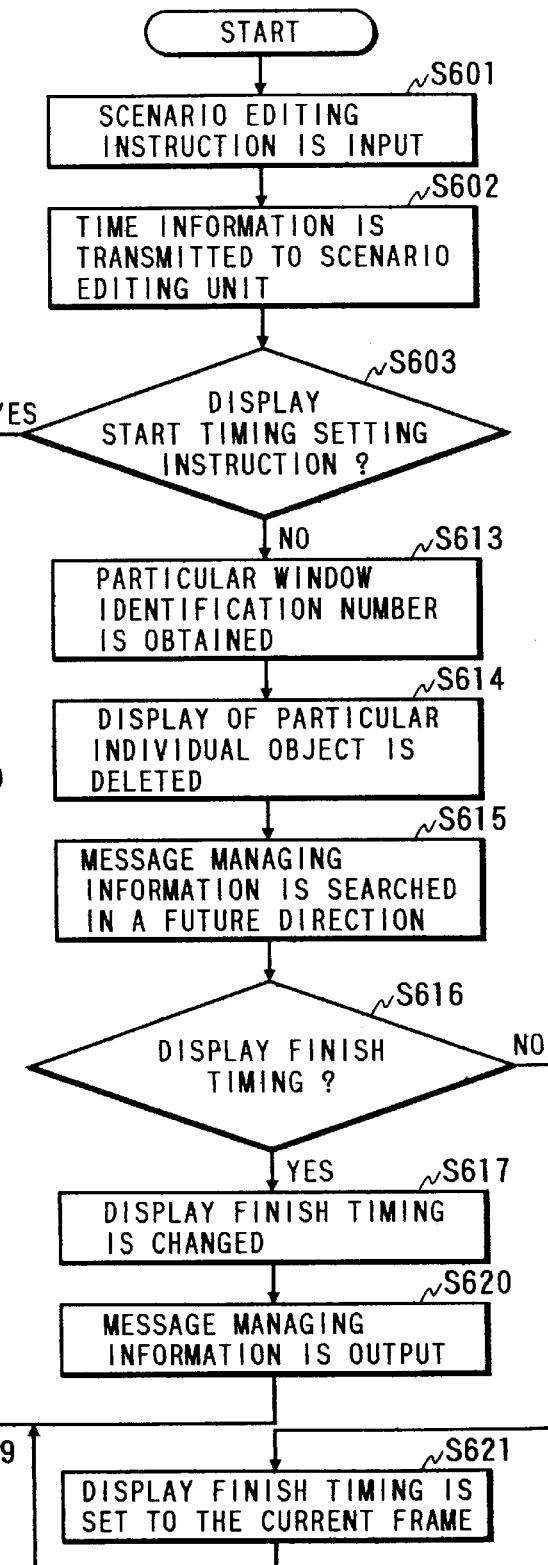
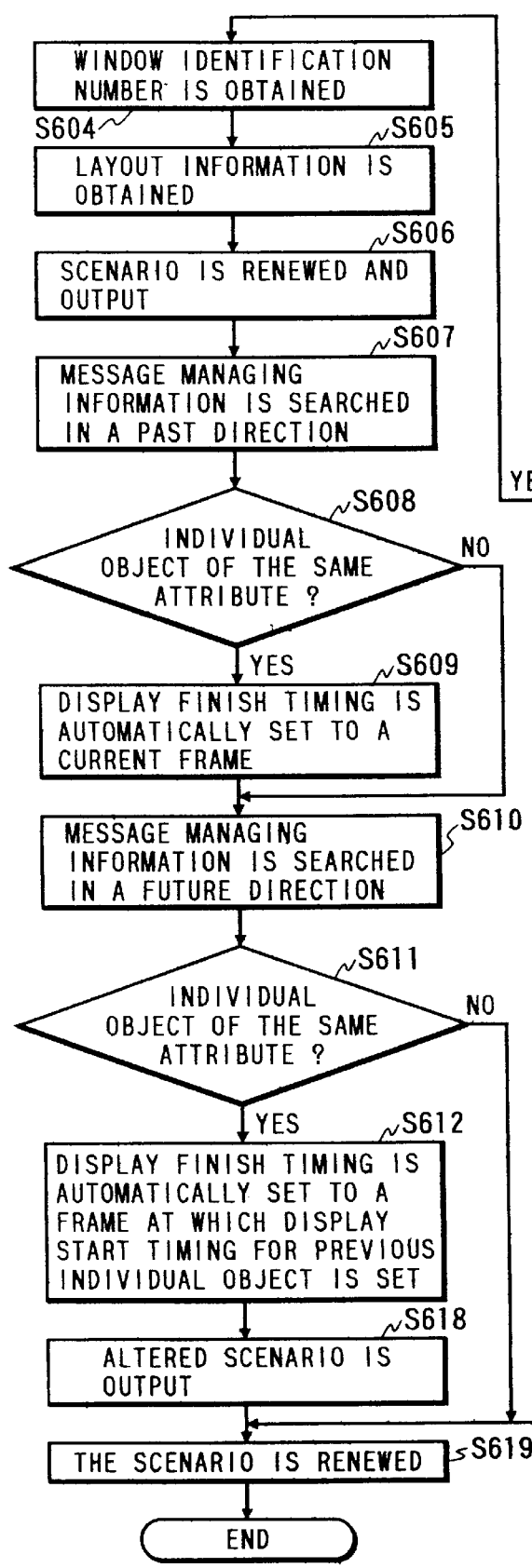
FIG. 43

FIG. 45

| TITLE NAME | OBJECT NUMBER | MESSAGE NUMBER | DYNAMIC IMAGE WINDOW NUMBER | STATIC IMAGE WINDOW NUMBER | TEXT WINDOW NUMBER |
|---|---|---|---|---|---|
| TITLE 1 | 4 | 7 | 1 | 2 | 1 |

| OBJECT IDENTIFICATION NUMBER | 0001 | 0002 | 0003 | 0004 |
|---|---|---|---|---|
| OBJECT NAME | FIRST DYNAMIC IMAGE | FIRST STATIC IMAGE | FIRST TEXT | SECOND DYNAMIC IMAGE |

| TIMING | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| F6 | 0004 | 0 | STATIC IMAGE W002 | STATIC IMAGE |
| F1 | 0004 | -1 | STATIC IMAGE W002 | STATIC IMAGE |
| F1 | 0002 | 0 | STATIC IMAGE W001 | STATIC IMAGE |
| F2 | 0003 | 0 | TEXT W001 | TEXT |
| F3 | 0002 | -1 | STATIC IMAGE W001 | STATIC IMAGE |
| F3 | 0003 | -1 | TEXT W001 | TEXT |

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |
| TEXT W001 | TEXT | W3 | H3 | X3 | Y3 |
| STATIC IMAGE W002 | STATIC IMAGE | W4 | H4 | X4 | Y4 |

FIG. 46

| TITLE NAME | OBJECT NUMBER | MESSAGE NUMBER | DYNAMIC IMAGE WINDOW NUMBER | STATIC IMAGE WINDOW NUMBER | TEXT WINDOW NUMBER |
|---|---|---|---|---|---|
| TITLE 1 | 4 | 6 | 1 | 2 | 1 |

| OBJECT IDENTIFICATION NUMBER | 0001 | 0002 | 0003 | 0004 |
|---|---|---|---|---|
| OBJECT NAME | FIRST DYNAMIC IMAGE | FIRST STATIC IMAGE | FIRST TEXT | SECOND DYNAMIC IMAGE |

| TIMING | OBJECT IDENTIFICATION NUMBER | MESSAGE IDENTIFICATION NUMBER | WINDOW IDENTIFICATION NUMBER | ATTRIBUTE |
|---|---|---|---|---|
| F0 | 0001 | 0 | DYNAMIC IMAGE W001 | DYNAMIC IMAGE |
| F1 | 0002 | 0 | STATIC IMAGE W001 | STATIC IMAGE |
| F2 | 0003 | 0 | TEXT W001 | TEXT |
| F7 | 0002 | -1 | STATIC IMAGE W001 | STATIC IMAGE |
| F7 | 0004 | 0 | STATIC IMAGE W002 | STATIC IMAGE |
| F3 | 0003 | -1 | TEXT W001 | TEXT |

| WINDOW IDENTIFICATION NUMBER | ATTRIBUTE | WIDTH | HEIGHT | X COORDINATE | Y COORDINATE |
|---|---|---|---|---|---|
| DYNAMIC IMAGE W001 | DYNAMIC IMAGE | W1 | H1 | X1 | Y1 |
| STATIC IMAGE W001 | STATIC IMAGE | W2 | H2 | X2 | Y2 |
| TEXT W001 | TEXT | W3 | H3 | X3 | Y3 |
| STATIC IMAGE W002 | STATIC IMAGE | W4 | H4 | X4 | Y4 |

SCENARIO EDITOR FOR MULTIMEDIA DATA AND SCENARIO REPRODUCING APPARATUS

BACKGROUND OF THE INVENTION

1. Field of the Invention

The present invention relates generally to a scenario editor for multimedia data and scenario reproducing apparatus, and more particularly to a scenario editor in which a plurality of static images and texts are assigned to a plurality of frames of display scenes one after another on the time-basis of a series of dynamic images and a scenario reproducing apparatus in which the static images and texts assigned to the display scenes on the time-basis of the dynamic images are reproduced.

2. Description of the Related Art

In a scenario editor for multimedia data, an editing operation is performed while setting a parameter relating to time information, a parameter relating to layout information and a parameter relating to the movement of objects. The objects denote multimedia data such as a dynamic image, a static image, a text and the like, and each frame of display scene is composed of one dynamic image object, one or more static image objects and text objects included in a configuration of a scenario.

In this case, a plurality of static image objects and text objects are assigned to a plurality of frames of display scenes on the time-basis of a series of frames of dynamic image object in a predetermined order according to the time information as if page data is assigned to each of pages of a book. To assign or delete a static object or a text object to/from each frame of display scene at an arbitrary timing indicated by a frame of dynamic image object relating to the time information for the purpose of preparing a scenario of a multimedia image by using the scenario editor, a scenario editing operation is performed as follows.

One frame of dynamic image object used as the timing information is selected, the scene of dynamic image is reproduced, and a reproducing operation is stopped at a particular frame of display scene to display the selected frame of dynamic image object on a display screen. Thereafter, a static or text object to be added or deleted to/from the particular frame of display scene is selected, and a display timing or a deletion timing of the static or text object is set.

In this scenario editing operation, only one object can be added or deleted for each operation. Therefore, it is required to perform a large number of operations equal to the number of adding and deleting objects for the purpose of preparing a scenario of a multimedia image.

Also, an infinite number of scenarios are treated in the scenario editor.

3. Problems to be Solved by The Invention

However, in cases where a plurality of static or text objects are assigned to a plurality of frames of display scene in a predetermined order as if page types data are assigned to pages of a book, because only one object is added for each scenario editing operation in a conventional scenario editor, it is required to select a static or text object according to the predetermined order for each operation, setting a display position and a display size for each selected object and setting a display timing or a deletion timing of each selected object, and a large number of scenario editing operations are troublesome.

For example, in cases where a lecture scene of a person is displayed on a display screen while displaying several tens of pages of materials relating to the lecture, the materials are assigned to a plurality of frames of display scene as a plurality of static objects on the time-basis of the lecture scene treated as a series of frames of dynamic object. In this case, it is required to select the materials one by one in a predetermined order and setting a display timing for each selected material. Therefore, there is a drawback that the editing operations cannot be efficiently performed.

Also, though a scenario edition can be arbitrarily performed by using a conventional scenario editor, an editor is required to perform the scenario editing operations while considering the three parameters, so that a superior editing faculty is required of the editor.

SUMMARY OF THE INVENTION

An object of the present invention is to provide, with due consideration to the drawbacks of such a conventional scenery editor, a scenery editor in which the assignment of a plurality of objects to a series of frames of display scene is easily performed even though it is required to assign the objects in a predetermined order.

Also, an object of the present invention is to provide a scenario reproducing apparatus in which the scenario scene is easily reproduce even though the objects are assigned in a predetermined order.

The object of the present invention is achieved by the provision of a scenario editor, comprising:

object information storing means for storing a plurality of individual objects;

page type object producing means for producing one or more groups of page type objects from the individual objects stored in the object information storing means according to a user's request;

object selecting means for selecting a particular group of page type objects from among the groups of page type objects produced in the page type object producing means;

scenario information inputting means for inputting a piece of intermediate scenario information indicating a display timing of the particular group of page type objects selected by the object selecting means and a deletion timing of the particular group of page type objects; and page change timing setting means for setting a display change timing of each of the page type objects in the particular group selected by the object selecting means according to the display timing and the deletion timing of the intermediate scenario information input by the scenario information inputting means and assigning the page type objects in the particular group to a dynamic image at the display change timing set for each of the page type objects to edit a scenario composed of the dynamic image and the page type objects in the particular group.

In the above configuration, in cases where a scenario composed of a dynamic image and a plurality of individual objects is edit, it is required to assign each of the individual objects to the dynamic image at a display changing timing.

In the present invention, the individual objects are unified to a particular group of page type objects, and a display timing of the particular group of page type objects and a deletion timing of the particular group of page type objects are input to the scenario information inputting means as a piece of intermediate scenario information. Thereafter, a display change timing of each of the page type objects in the particular group is set according to the display timing and the deletion timing by the page change timing setting means, and each of the page type objects is assigned to the dynamic image at the display change timing.

Accordingly, the scenario can be easily edit without inputting any display change timing of each of the page type objects in the particular group.

The object of the present invention is also achieved by the provision of a scenario reproducing apparatus of multimedia data for reproducing a scenario in which a group of page type objects, comprising:

object information storing means for storing the group of page type objects;

scenario information storing means for storing a piece of scenario information of the scenario;

scenario control means for outputting a display message or a deletion message of each of the page type objects in the group stored in the object information storing means according to the scenario information stored in the scenario information storing means;

page change control means for performing a page change operation for the page type objects in the group stored in the object information storing means according to a user's request; and object displaying means for displaying or deleting each of the page type objects in the group stored in the object information storing means in a display period indicated by the scenario information according to the page change operation performed by the page change control means.

In the above configuration, a user can arbitrarily turn each of the page type objects in a reproducing operation of the scenario. Because it is not required to assign a display timing of each of the page type objects to the dynamic image, a scenario editing operation can be easily performed.

The object of the present invention is also achieved by the provision of a scenario editor, comprising:

layout information receiving means for receiving pieces of layout information of a plurality of individual objects;

layout information storing means for storing the pieces of layout information received by the layout information receiving means;

object specifying means for specifying a dynamic image object and one or more individual objects selected by a user;

time information receiving means for receiving a display start time and a display finish time for each of the individual objects specified by the object specifying means;

time information storing means for storing the display start time and the display finish time received by the time information receiving means for each of the individual objects; and scenario editing means for assigning each of the individual objects specified by the object specifying means to the dynamic image object specified by the object specifying means according to the pieces of layout information stored in the layout information storing means to start the display of each of the individual objects at the display start time stored in the time information storing means and finish the display of each of the individual objects at the display finish time stored in the time information storing means and obtaining a time relationship between the dynamic image object and each of the individual objects assigned to the dynamic image object as an edited scenario.

In the above configuration, the reception of layout information by the layout information receiving means and the reception of the time information composed of the display start time and the display finish time by the time information receiving means are separately performed for each of the individual objects selected by the user, and each of the individual objects is assigned to the dynamic image object according to the layout information and the time information. Therefore, because the user can specify the individual objects and the user can input the layout information and the time information without considering any elapsing time, the scenario can be easily edited.

The object of the present invention is also achieved by the provision of a scenario editor comprising:

object selecting means for selecting a particular dynamic image object from a plurality of dynamic image objects and selecting a particular individual object from a plurality of individual objects;

layout information storing means for storing a piece of dynamic image layout information for the dynamic image objects in common and a piece of individual object layout information for the individual objects in common;

reproducing and stopping instruction receiving means for receiving a reproducing instruction and a stopping instruction;

dynamic image reproducing means for reproducing the particular dynamic image object selected by the object selecting means frame by frame according to the reproducing instruction received by the reproducing and stopping instruction receiving means and stopping the reproduction of the particular dynamic image object at a particular frame according to the stopping instruction received by the reproducing and stopping instruction receiving means;

time information storing means for storing the particular frame of the particular dynamic image object obtained by the dynamic image reproducing means;

selected object displaying means for displaying the particular dynamic image object and the particular individual object selected by the object selecting means, displaying the particular dynamic image object frame by frame according to the reproducing instruction received by the reproducing and stopping instruction receiving means and maintaining the display of the particular frame of the particular dynamic image object according to the stopping instruction received by the reproducing and stopping instruction receiving means;

scenario editing instruction receiving means for receiving a display start timing or a display finish timing; and scenario editing means for assigning the particular individual object selected by the object selecting means to the particular dynamic image object selected by the object selecting means according to the dynamic image layout information and the individual object layout information stored in the layout information storing means to start the display of the particular individual object at the particular frame of the particular dynamic image in cases where the display start timing is received by the scenario editing instruction receiving means and to finish the display of the particular individual object at the particular frame of the particular dynamic image in cases where the display finish timing is received by the scenario editing instruction receiving means and obtaining a time relationship between the particular dynamic image object and the particular individual objects assigned to the particular dynamic image object as an edited scenario.

In the above configuration, when a user selects the particular dynamic image object and the particular individual object, the particular dynamic image object and the particular individual object are displayed by the selected object displaying means. Therefore, the user can confirm the particular dynamic image object and the particular individual object prior to a scenario editing operation. Thereafter, when a reproducing instruction is input to the reproducing and stopping instruction receiving means by the user, the particular dynamic image is reproduced by the dynamic image reproducing means, and the particular dynamic image is displayed frame by frame by the selected object displaying means. Thereafter, when a stopping instruction is input to the reproducing and stopping instruction receiving means by the user, the reproduction of the particular dynamic image is stopped by the dynamic image reproducing means, and the display of a particular frame of the particular dynamic image is maintained by the selected object displaying means.

Thereafter, in cases where a display start timing or a display finish timing is input to the scenario editing instruction receiving means by the user, the particular individual object is assigned to the particular dynamic image object by the scenario editing means according to the dynamic image layout information and the individual object layout information stored in the layout information storing means to start or finish the display of the particular individual object at the particular frame of the particular dynamic image.

Accordingly, the user can separately perform the selection of the objects, the input of the reproducing and stopping instructions and the input of the display start timing and the display finish timing while checking the objects shown by the selected object displaying means, and a scenario in which the particular individual object is assigned to the particular dynamic image object can be easily edited.

Also, because the dynamic image layout information is fixed for a plurality of dynamic image objects in common and the individual object layout information is fixed for a plurality of individual objects in common, the user is not required to input any piece of layout information.

BRIEF DESCRIPTION OF THE DRAWINGS

The objects, features and advantages of the present invention will be apparent from the following description taken in conjunction with the accompanying drawings, in which:

FIG. 3 shows an example of dynamic image object names indicated by dynamic image identification numbers and individual object names indicated by individual object identification numbers according to the first embodiment;

FIG. 4 shows an example of a page type object definition file of a static image produced according to the first embodiment and another example of a page type object definition file of a text produced according to the first embodiment;

FIG. 5 shows an example of page type object information produced according to the first embodiment;

FIG. 6 shows an example of a configuration of a scenario edited according to the first embodiment;

FIG. 7 is a flow chart showing a procedure for setting the scenario configuration shown in FIG. 6;

FIG. 8A is an example of object managing information of intermediate scenario information set according to the first embodiment;

FIG. 8B is an example of message managing information of the intermediate scenario information set according to the first embodiment;

FIG. 8C is an example of window managing information of the intermediate scenario information set according to the first embodiment;

FIG. 10A is an example of object managing information of final scenario information produced according to the first embodiment;

FIG. 10B is an example of message managing information of the final scenario information produced according to the first embodiment;

FIG. 19B is an example of message managing information of the intermediate scenario information changed according to the fourth embodiment;

FIG. 19C is an example of window managing information of the intermediate scenario information changed according to the fourth embodiment;

FIG. 20 is an example of a page type object definition file for defining a new group of page type objects reset according to the fourth embodiment;

FIG. 21A is an example of object managing information of final scenario information obtained in the scenario editor shown in FIG. 18;

FIG. 21B is an example of message managing information of the final scenario information obtained in the scenario editor shown in FIG. 18;

FIG. 21C is an example of window managing information of the final scenario information obtained in the scenario editor shown in FIG. 18;

FIG. 25 is an example of dynamic image object information and individual object information for a dynamic image object and individual objects selected by a user in the hyper-video type scenario editor shown in FIG. 22;

FIG. 26 is an example of layout information for the selected dynamic image object and the selected individual objects;

FIG. 27 is an example of time information stored in a time information storing unit of the scenario editor shown in FIG. 22;

FIG. 28A shows an example of title managing information of an edited scenario obtained in the scenario editor shown in FIG. 22;

FIG. 28B shows an example of object managing information of an edited scenario obtained in the scenario editor shown in FIG. 22;

FIG. 28C shows an example of message managing information of an edited scenario obtained in the scenario editor shown in FIG. 22;

FIG. 28D shows an example of window managing information of an edited scenario obtained in the scenario editor shown in FIG. 22;

FIG. 29 is a block diagram of a hyper-video type scenario editor according to a sixth embodiment of the present invention;

FIG. 30 shows displaying screens and buttons used in the scenario editor shown in FIG. 29;

FIG. 31 is a flow chart showing a display timing setting operation performed in a reproducing and stopping instruction receiving unit of the scenario editor shown in FIG. 29;

FIG. 32 is a flow chart of a display timing setting operation performed by a user according to the sixth embodiment;

FIG. 34 shows an example of object information stored in a object information storing unit of the scenario editor shown in FIG. 29;

FIG. 35 shows an example of layout information stored in a layout information storing unit of the scenario editor shown in FIG. 29;

FIG. 36 shows an example of object information stored in a selected object information storing unit of the scenario editor shown in FIG. 29;

FIG. 38 shows an example of title managing information, object managing information, message managing information and window managing information of a scenario stored in a scenario storing unit of the scenario editor shown in FIG. 29;

FIG. 39 shows an example of title managing information, object managing information, message managing information and window managing information of another scenario stored in the scenario storing unit of the scenario editor shown in FIG. 29;

FIG. 42A shows an example of an object information stored in a displayed object information storing unit of the scenario editor shown in FIG. 40;

FIG. 42B shows another example of an object information stored in a displayed object information storing unit of the scenario editor shown in FIG. 40;

FIG. 43 is a flow chart of a scenario editing operation performed in a scenario editing unit of the scenario editor shown in FIG. 40;

FIG. 44 shows an example of message managing information of a scenario altered according to a scenario altering operation shown in FIG. 41A;

FIG. 45 shows an example of a scenario altered according to a scenario altering operation shown in FIG. 41B;

FIG. 46 shows an example of a scenario altered according to a scenario altering operation shown in FIG. 41C;

DETAILED DESCRIPTION OF THE EMBODIMENTS

Preferred embodiments of a scenario editor and a scenario reproducing apparatus according to the present invention are described with reference to drawings.

Figure 1:
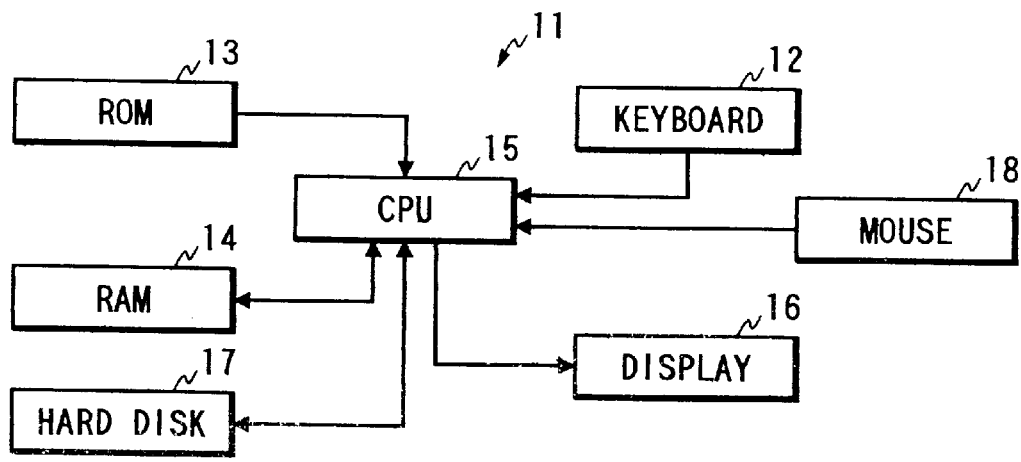
FIG. 1 is a block diagram of a hardware system used for embodying a scenario editor and a scenario reproducing apparatus according to the present invention.

FIG. 1 is a block diagram of a hardware system used for embodying a scenario editor and a scenario reproducing apparatus according to the present invention.

As shown in FIG. 1, a hardware system 11 comprises a keyboard 12 for receiving input data, a read only memory (ROM) 13 for storing a prescribed program, a random access memory (RAM) 14 for storing object data received by the keyboard 12, a central processing unit (CPU) 15 for processing the object data stored in the RAM 14 according to the program stored in the ROM 13, a display 16 for displaying the processed object data, a hard disk 17 for storing scenario information, and a mouse 18 for inputting various instructions.

(First Embodiment)

Figure 2:
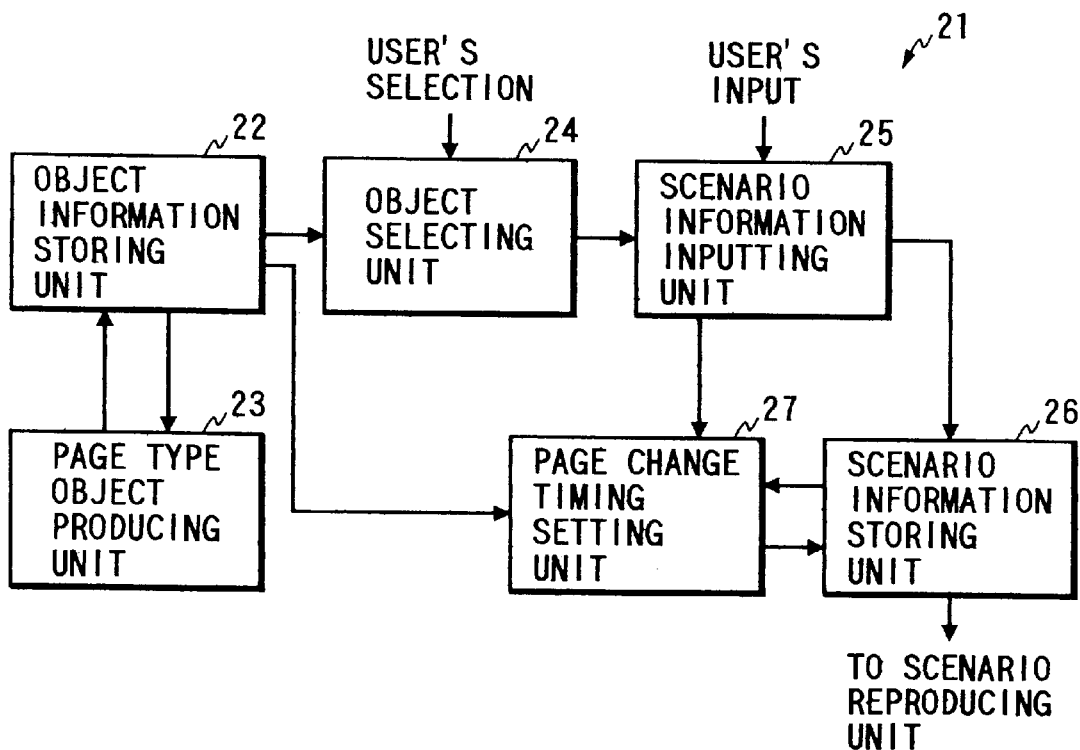
FIG. 2 is a block diagram of a scenario editor according to a first embodiment of the present invention.

FIG. 2 is a block diagram of a scenario editor according to a first embodiment of the present invention.

As shown in FIG. 2, a scenario editor 21 comprises
an object information storing unit 22 embodied by the RAM 14 for storing a plurality of individual objects, a plurality of page type objects and a plurality of page type object definition files, a page type object producing unit 23 embodied by the CPU 15 for assigning a plurality of page numbers to a plurality of individual objects stored in the object information storing unit 22 in an increasing order according to a user's request to produce a plurality of page type objects from the individual objects and preparing the page type object definition files respectively defining a plurality of page type objects numbered by a series of page numbers as a group of page type objects, an object selecting unit 24 embodied by the keyboard 12 for selecting one or more groups of page type objects defined: by one or more page type object definition files from the page type objects stored in the object information storing unit 22 according to a user's request, a scenario information inputting means 25 embodied by the keyboard 12 for inputting a display position, a display size, a display timing and a deletion timing for each group of page type objects selected by the object selecting unit 24 as a piece of intermediate scenario information, a scenario information storing unit 26 embodied by the RAM 14 for storing the intermediate scenario information input to the scenario information inputting means 25 and storing a piece of final scenario information, and a page change timing setting unit 27 embodied by the CPU 15 for automatically setting a page change timing of each of the page type objects in each of the groups selected by the object selecting unit 24 according to the display and deletion timing of the intermediate scenario information stored in the scenario information storing unit 26 to assign a plurality of page type objects in each of the selected groups to a dynamic image (or video clips) object at equal intervals and adding the page change timing to the intermediate scenario information to produce the final scenario information.

In the above configuration, each of the individual and page type objects is a static image (or still picture) object, a text object or the like, and a plurality of page type objects defined as a group are automatically assigned to one or more frames of dynamic objects at equal intervals according to the change timing of the final scenario information. Therefore, in a multimedia screen image of a prepared scenario, a plurality of static images and a plurality of text images are displayed with a series of frames of dynamic image on a window of a display screen embodied by the display 16 at equal intervals as if a reader turns the pages of a book.

In detail, a user initially prepares a plurality of page type objects from a plurality of individual objects stored in the object information storing unit 22. That is, as shown in FIG. 3, three groups such as a group of dynamic image objects, a group of individual objects relating to static images and a group of individual objects relating to texts are separately stored in the object information storing unit 22, each of the dynamic objects is indicated by a dynamic object name, each of the individual objects is indicated by an individual object name, a dynamic image management identification number is attached to each of the dynamic image objects to identify each of the dynamic image objects, an individual object management identification number such as a static image management identification number or a text management identification number is attached to each of the individual objects to identify each of the individual objects.

A plurality of individual objects stored in the object information storing unit 22 are selected one by one and are numbered by page numbers in the page type object producing unit 23 to define the individual objects as a group of page type objects. Each group of page type objects is defined by a page type object definition file. Thereafter, one or more groups of page type objects and one or more page type object definition files are stored in the object information storing unit 22. In this case, the page type objects defined by a page type object definition file have the same attribute such as a static image attribute or a text attribute.

In each of the page type object definition files, as shown in FIG. 4, attribute information specifying a type of page type objects, a total page number indicating the total number of page type objects in a group and page information indicating individual object names of a plurality of individual objects from which a plurality of page type objects are prepared are set.

As shown in FIG. 5, each group of the page type objects is indicated by a page type object name, and a page type object management identification number is attached to each group of the page type objects to identify each group. A piece of page type object information composed of one page type object name and one page type object management identification number is stored with a corresponding group of page type objects in the object information storing unit 22.

Thereafter, a configuration of a scenario desired to be prepared by the user is set by selecting one or more groups of page type objects stored in the object information storing unit 22. For example, in cases where the configuration of a scenario shown in FIG. 6 is desired to be prepared by the user, a first dynamic image object named a first dynamic image, a first group of page type objects and a second group of page type objects are selected in the object selecting unit 24, a piece of intermediate scenario information is input to the scenario information inputting unit 25, the display of the first dynamic image is started at a frame F0 according to the intermediate scenario information, the display of the first group of page type objects is started at a frame F1 according to the intermediate scenario information, the display of the second group of page type objects is started at a frame F2 according to the intermediate scenario information, the display of the first group of page type objects is finished at a frame F3 according to the intermediate scenario information, the display of the second group of page type objects is finished at a frame F4 according to the intermediate scenario information, and the display of the first dynamic image is finished at a frame F5 according to the intermediate scenario information.

Thereafter, a change timing of each of a plurality of page type objects is automatically set in the page change timing setting unit 27 according to the configuration of the scenario to display the page type objects in the first group at equal intervals between the first and third frames F1 and F3 and display the page type objects in the second group at equal intervals between the second and fourth frames F2 and F4.

The setting of a scenario configuration is described in detail with reference to FIG. 7.

In a step S101, the first dynamic image object "first dynamic image" used as a time-basis is selected by the user by using the object selecting unit 24. In a step S102, the first group of page type objects and the second group of page type objects are selected in the same manner. In a step S103, a display position and a display size are input to the scenario information inputting unit 25 for each of the page type objects. In a step S104, a starting frame at which the display of a group of page type objects is started and a finishing frame at which the display of a group of page type objects is finished are input to the scenario information inputting unit 25 for each of groups. The display positions, the display sizes, the starting frames and the finishing frames input to the scenario information inputting unit 25 are converted to a piece of intermediate scenario information in the unit 25, and the intermediate scenario information is stored in the scenario storing unit 26.

The intermediate scenario information indicates a configuration of a scenario. As shown in FIGS. 8A to 8C, the intermediate scenario information is classified into object managing information, message managing information and window managing information. The object managing information indicates information of one dynamic image object and one or more groups of page type objects used in a scenario. The message managing information indicates the starting and finishing frames of each of the dynamic image object and the groups of page type objects. The window managing information indicates the display position and size of each of the groups of page type objects.

An object identification number in the object managing information is used to identify each of the dynamic image object and the groups of page type objects, and each object identification number corresponds to a dynamic image object name or one page type object name of one group of page type objects. A frame in the message managing information denotes a frame of the dynamic image and is used as a starting timing and a finishing timing. A message identification number is used to identify a type of message. For example, a message identification number "0" indicates a display operation, and a message identification number "−1" indicates a deletion operation. A window identification number is used to identify the dynamic image or one static or text object displayed on a display screen. An attribute indicates a type of object such as a dynamic image object, a static image or a text. A width indicates a width of one object displayed on the display screen, A height indicates a height of one object displayed on the display screen, and X and Y coordinates indicate a position of one object displayed on the display screen.

Thereafter, a page change timing of each page type object is set according to the intermediate scenario information in the page change timing setting unit 27, and a final scenario information is produced.

Figure 9:
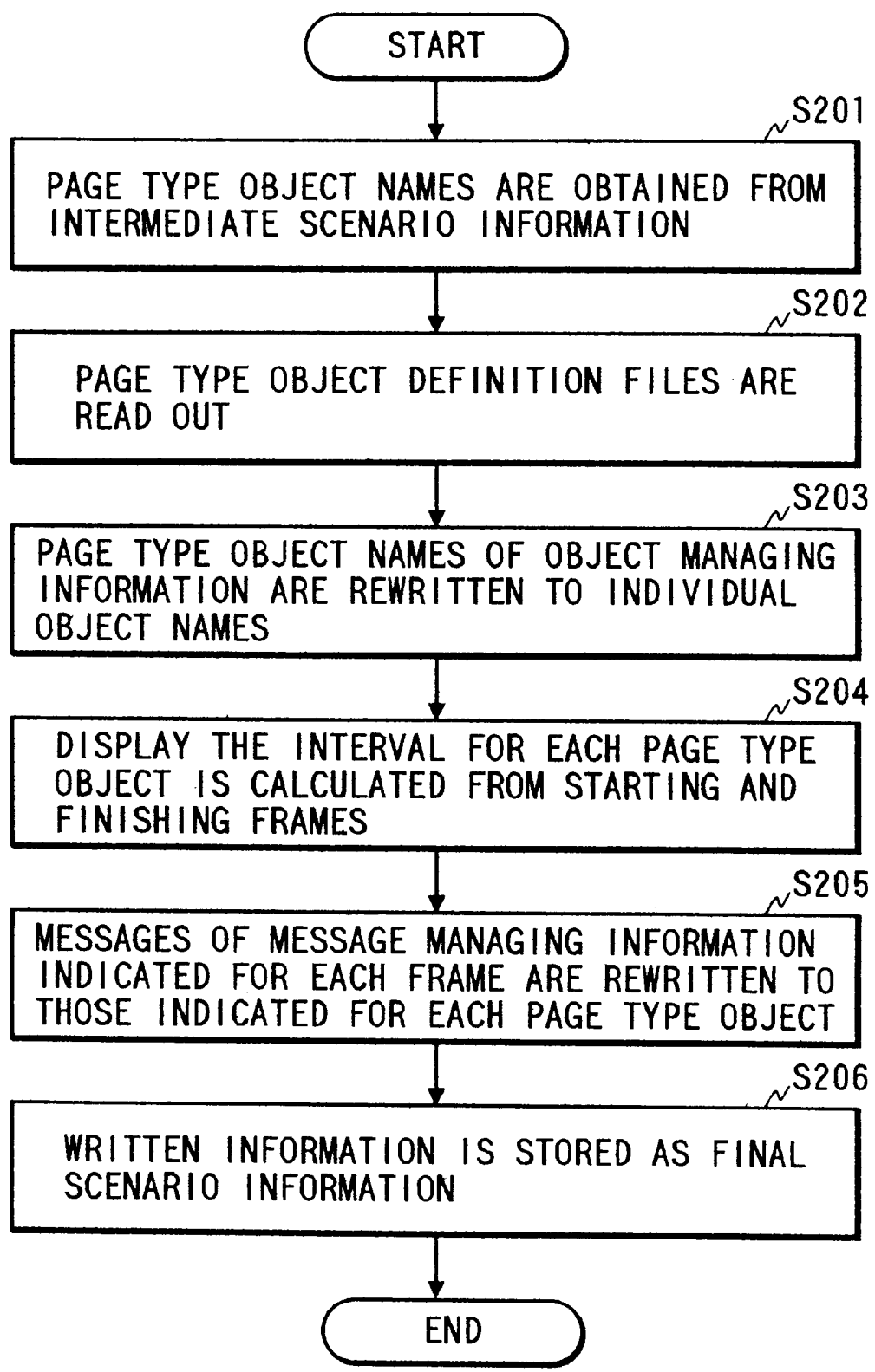
FIG. 9 is a flow chart showing an operation performed in a page change timing setting unit shown in FIG. 2.

In detail, as shown in FIG. 9, intermediate scenario information stored in the scenario storing unit 26 is taken out to the page change timing setting unit 27, and one or more page type object names set in the object managing information are obtained from the intermediate scenario information (step S201). Thereafter, one or more page type object definition files indicated by the page type object names are read out from the object information storing unit 22 to the page change timing setting unit 27 (step S202). Thereafter, the page type object names of the object managing information are rewritten to a plurality of individual object names of a plurality of individual objects which are written in each of the page type object definition files as the page information (step S203). As a result, the object managing information shown in FIG. 10A is obtained. Thereafter, a displaying time interval for each page type object is calculated from the starting and finishing frames of one group of page type objects in the page change timing setting unit 27 (step 204). For example, because the starting frame for the first group of page type objects is the frame F1 and the finishing frame for the first group of page type objects is the frame F3, in cases where the number of page type objects in the first group is twenty, a displaying time interval TI for each page type object is TI=(F3−F1)/20.

Thereafter, though messages of one object identification number, one message identification number, one window identification number and one attribute are indicated for each frame in the message managing information as shown in FIG. 8B, the messages are rewritten to those indicated for each page type object (step S205). In this case, a static image object or a text object is written as the attribute, and each of the page type object is treated as an individual object. For example, after the frame F0, the display of a first page type object in the first group is started at a divided frame f1=F1, and the display of the first page type object is finished at a divided frame f2=F1+(F3−F1)/20. Also, the display of a first page type object in the second group is started at a divided frame f20=F2, and the display of the first page type object is finished at a divided frame f21=F2+(F4−F2)/10.

Thereafter, the final scenario information composed of the written object managing information, the written message managing information and the window managing information is stored in the scenario storing unit 26 (step S206).

Because the final scenario information is expressed by a plurality of individual objects, the final scenario information can be reproduced in a conventional scenario reproducing apparatus.

Accordingly, because a pair of starting and finishing frames are input for each groups of page type objects and a page change timing is automatically set for each of a plurality of page type objects in each group to treat each of the page type objects as an individual object, it is not required to manually determine a display starting timing and a display finishing timing for each of objects, and the number of scenario editing operations can be considerably reduced.

Also, because the display time intervals for the page type objects in each group are set at equal intervals, a scenario in which a display timing for each page type object is not strictly required can be easily produced.

(Second Embodiment)

In a scenario editor according to a second embodiment of the present invention, a plurality of page type objects in each group are assigned to a dynamic image object at desired intervals.

Figures 10C, 11:
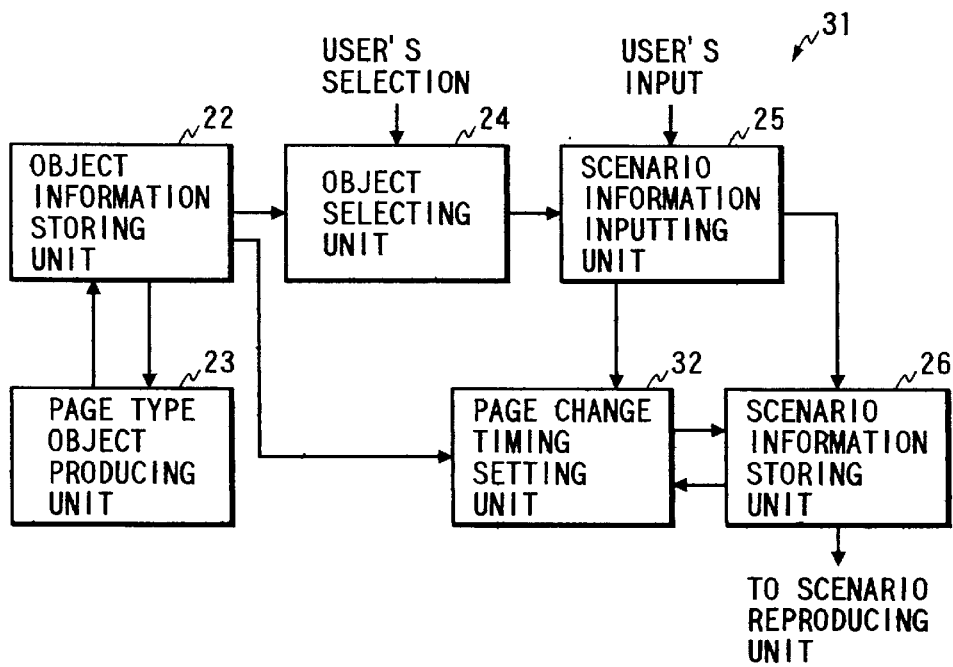
FIG. 10C is an example of window managing information of the final scenario information produced according to the first embodiment.
FIG. 11 is a block diagram of a scenario editor according to a second embodiment of the present invention.

FIG. 11 is a block diagram of a scenario editor according to a second embodiment of the present invention.

As shown in FIG. 11, a scenario editor 31 comprises the object information storing unit 22, the page type object producing unit 23, the object selecting unit 24, the scenario information inputting means 25, the scenario information storing unit 26, and a page change timing setting unit 32 embodied by the CPU 15 for setting a page change timing of one page type object for each of the page type objects in each of groups selected by the object selecting unit 24 according to the display and deletion timing of the intermediate scenario information stored in the scenario information storing unit 26 to assign each group of page type objects to a dynamic image object at desired interval and adding the page change timing to the intermediate scenario information to prepare the final scenario information.

Figure 12:
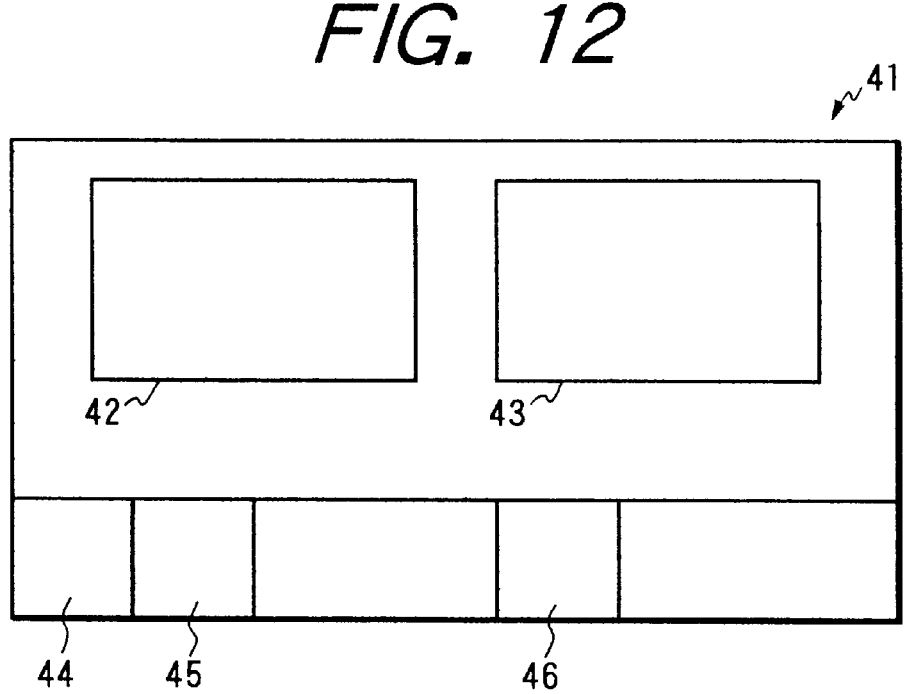
FIG. 12 shows an example of an operation screen provided by a page change timing setting unit shown in FIG. 11.

In the above configuration, a user produces final scenario information from the intermediate scenario information input to the scenario information inputting means in the page change timing setting unit 32 while operating an operation screen displayed on the display 16 by the page change timing setting unit 32. That is, as shown in FIG. 12. The operation screen 41 comprises a dynamic image display window 42 for displaying a dynamic image frame by frame, a page type object display window 43 for displaying a plurality of page type objects one by one, a reproduction button 44 for reproducing the dynamic image on the dynamic image display window 42, a stop button 45 for stopping the reproduction of the dynamic image, and a page change button 46 for changing a page type object displayed on the page type object display window 43 to a next one.

Figure 13:
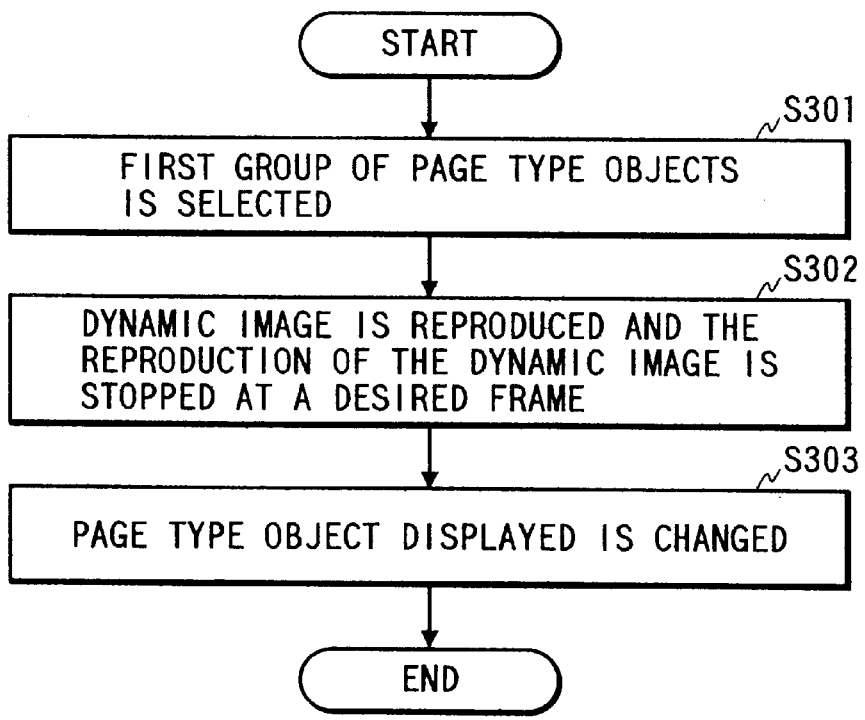
FIG. 13 is a flow chart showing an operation performed in a page change timing setting unit shown in FIG. 11.

A procedure for producing final scenario information from the intermediate scenario information is performed according to a flow chart shown in FIG. 13.

In a step S301, an intermediate scenario information stored in the scenario storing unit 26 is taken out to the page change timing setting unit 32. A user selects the first group of page type objects from a plurality of groups of page type objects set in the object managing information of the intermediate scenario information to set a page change timing for each of the page type objects in the first group. In the page change timing setting unit 32, a page type object definition file corresponding to the first group of page type objects is read out from the object information storing unit 22 to the page change timing setting unit 32, the page type object name of the first group of page type objects in the object managing information of the intermediate scenario information is rewritten to a plurality of individual object names of a plurality of individual objects which are written in the page type object definition file as the page information. Thereafter, the operation screen 41 is displayed on the display 16 under control of the page change timing setting unit 32, the dynamic image at the first frame F1 is displayed on the dynamic image display window 42, and a top page type object in the first group is displayed on the page type object display window 43.

In a step S302, the user pushes the reproduction button 44 to reproduce a plurality of frames of the dynamic image frame by frame, and the user pushes the stop button 45 when a desired frame Fa of dynamic image is displayed on the dynamic image display window 42. Therefore, the display of the desired frame Fa of dynamic image is maintained.

In a step S303, the user pushes the page change button 46 to display a second page type object in the first group on the page type object display window 43. In this case, the message managing information of the intermediate scenario information is rewritten to stop the display of the top page type object at the frame Fa and start the display of the second page type object at the frame Fa.

The steps S302 and S303 are repeated until a page changing timing for each of all page type objects in the first group is set. Also, a page changing timing for each of all page type objects in the second group is set in the same manner. As a result, the final scenario information is obtained in the same manner as that shown in FIGS. 10A to 10C. Thereafter, the final scenario information is stored in the scenario storing unit 26.

Because the final scenario information is expressed by a plurality of individual objects, the final scenario information can be reproduced in a conventional scenario reproducing apparatus.

Accordingly, because a pair of starting and finishing frames are input for each groups of page type objects and a page change timing is desirably set for each of a plurality of page type objects in each group to treat each of the page type objects as an individual object, the user can easily set a display starting timing and a display finishing timing for each of objects.

Also, because the display time intervals for the page type objects in each group are set at desired intervals, a scenario in which a display timing for each page type object is strictly required can be easily produced.

(Third Embodiment)

In a scenario reproducing apparatus according to a third embodiment of the present invention, each of the page type objects in one group is reproduced according to the intermediate scenario information when the reproduction of each page type object is requested by a user.

Figure 14:
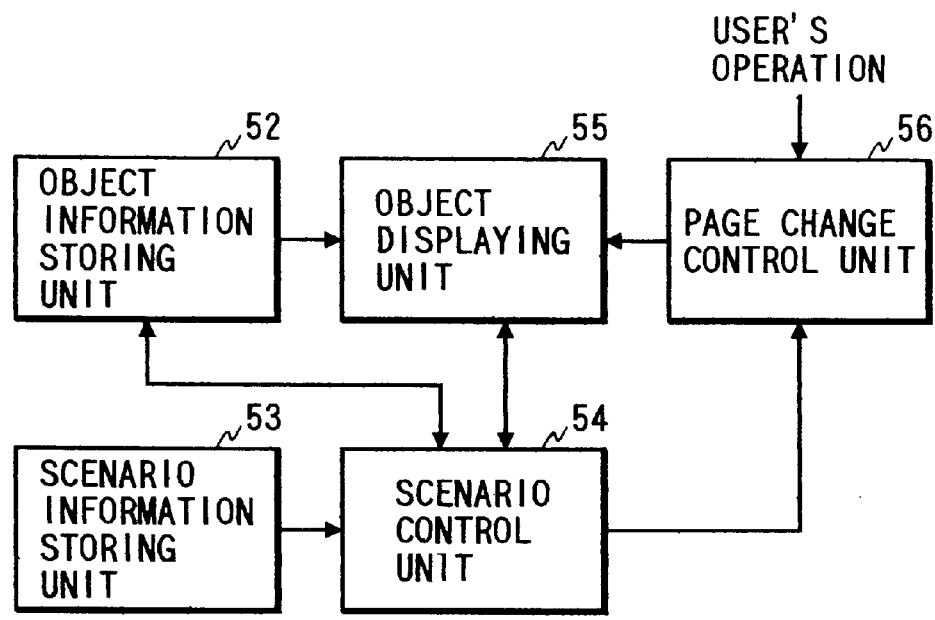
FIG. 14 is a block diagram of a scenario reproducing apparatus according to a third embodiment of the present invention.

FIG. 14 is a block diagram of a scenario reproducing apparatus according to a third embodiment of the present invention.

As shown in FIG. 14, a scenario reproducing apparatus 51 comprises an object information storing unit 52 embodied by the RAM 14 for storing a dynamic image object, a plurality of groups of page type objects, a plurality of pieces of page type object information (FIG. 5) and a plurality of page type object definition files (FIG. 4) defining the groups of page type objects, a scenario information storing unit 53 embodied by the RAM 14 for storing the intermediate scenario information, a scenario control unit 54 embodied by the CPU 15 for outputting a display message or a deletion message according to the intermediate scenario information stored in the scenario information storing unit 53, an object displaying unit 55 embodied by the display 16 for displaying one page type object according to the display message or the deletion message output from the scenario control unit 54, and a page change control unit 56 embodied by the CPU 15 for performing a page changing operation in which the page type object displayed on the object displaying unit 55 is changed to a next one.

Figure 15:
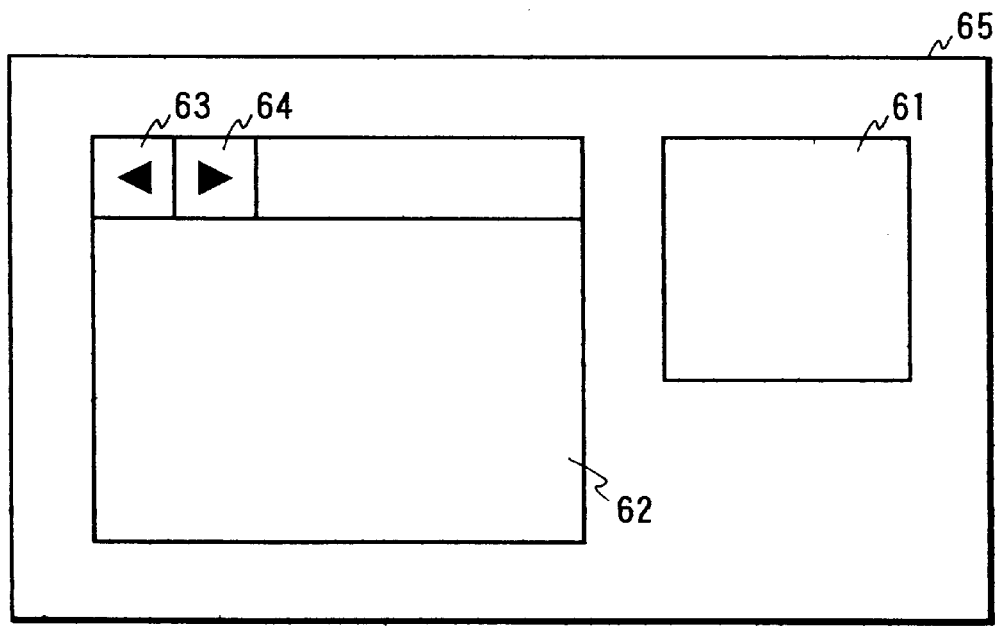
FIG. 15 shows a scenario reproducing screen according to the third embodiment.

In the third embodiment, as shown in FIG. 15, a dynamic window 61 for displaying a dynamic image, a page type object window 62 for displaying a page type object such as a static image or a text, a page returning button 63 for returning the page type object displayed on the page type object window 62 to a previous page type object, and a page advancing button 64 for advancing the page type object displayed on the page type object window 62 to a next page type object is displayed on a scenario reproducing screen 65 placed in the object displaying unit 55.

The intermediate scenario information stored in the scenario information storing unit 53 is read to the scenario control unit 54, and a display message or a deletion message is transmitted from the scenario control unit 54 to the object displaying unit 55 at a message transmission time (or a frame of the dynamic image) specified in the intermediate scenario information to control a display or deletion operation of the dynamic image object and the page type objects performed in the object displaying unit 55. For example, because the intermediate scenario information indicates that the display of the dynamic image object is started at the frame F0, the display message is transmitted from the scenario control unit 54 to the object displaying unit 55 at the frame F0, the dynamic image object is transferred from the object information storing unit 52 to the object displaying unit 55 under the control of the scenario control unit 54, and the dynamic image object is displayed on the dynamic window 61 at the frame F0. Also, because the intermediate scenario information indicates that the display of the first group of page type objects is started at the frame F1, the top page type object in the first group is transferred from the object information storing unit 52 to the object displaying unit 55 under the control of the scenario control unit 54, the top page type object is displayed on the page type object window 62, a display request for requesting the display of a pair of page change control buttons denoting the page returning button 63 and the page advancing button 64 is transmitted from the scenario control unit 54 to the page change control unit 56. Also, because the intermediate scenario information indicates that the display of the first group of page type objects is finished at the frame F3, the deletion message is transmitted from the scenario control unit 54 to the object displaying unit 55 at the frame F3, the first group of page type objects displayed on the page type object window 62 is deleted at the frame F3 under the control of the scenario control unit 54, a deletion request for requesting the deletion of the page change control buttons 63 and 64 displayed on the scenario reproducing screen 65 is transmitted from the scenario control unit 54 to the page change control unit 56.

In the page change control unit 56, when the display request is received, the page change control buttons 63 and 64 are displayed on the scenario reproducing screen 65, and a value of a page counter is set to 1. Also, when the deletion request is received, the page change control buttons 63 and 64 displayed on the scenario reproducing screen 65 is deleted.

Figure 16:
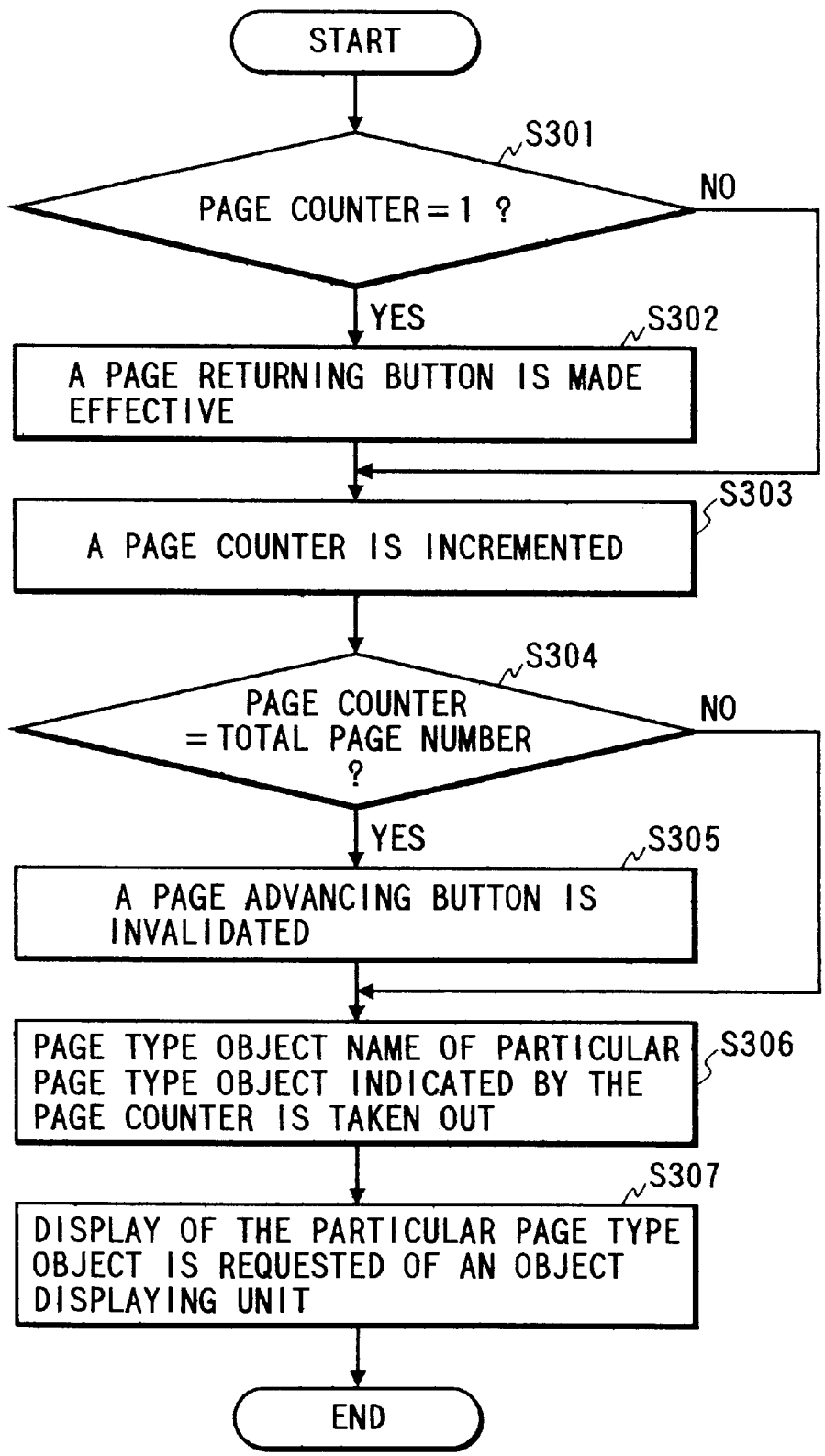
FIG. 16 is a flow chart showing a procedure performed when a page advancing button displayed on the scenario reproducing screen is pushed.

In cases where a user pushes the page advancing button 64 when the button 64 is displayed on the scenario reproducing screen 65, the page change control unit 56 is operated according to a procedure shown in FIG. 16.

In a step S301, it is checked by the page change control unit 56 whether or not a value of the page counter is equal to 1. In cases where a value of the page counter is set to 1, the page returning button 63 is treated as an effective button in a step S302, and the value of the page counter is incremented in a step S303. In contrast, in cases where a value of the page counter is not set to 1 in the step S301, the procedure jumps to the step S303.

In a step S304, it is checked by the page change control unit 56 whether or not the value of the page counter is equal to the total number of page type objects in the first group. In cases where the value of the page counter is equal to the total number of page type objects, the page advancing button 64 is invalidated in a step S305, and a page type object name of a particular page type object indicated by the value of the page counter is taken out from the page type object definition file corresponding to the first group of page type objects in a step S306. For example, in cases where the value of the page counter is set to N, a page type object name of an N-th page type object in the first group is taken out. In contrast, in cases where the value of the page counter is not equal to the total number of page type objects in the step S304, the procedure jumps to S306.

In a step S307, a display request for requesting the display of the particular page type object indicated by the page type object name is transmitted from the page change control unit 56 to the object displaying unit 55. Therefore, the particular page type object is displayed on the page type object window 62.

Figure 17:
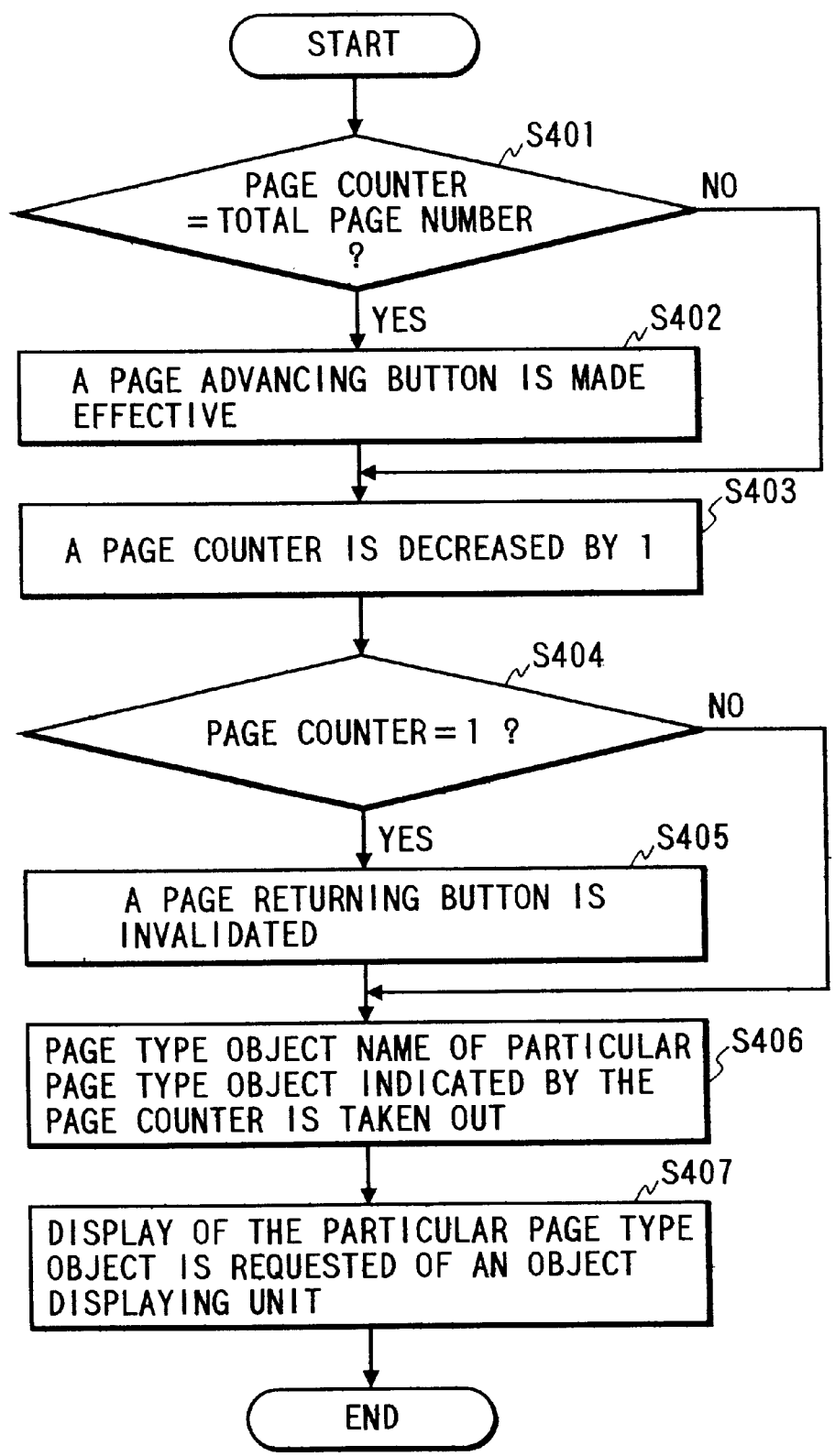
FIG. 17 is a flow chart showing a procedure performed when a page returning button displayed on the scenario reproducing screen is pushed.

In contrast, in cases where a user pushes the page returning button 63 when the button 64 is displayed on the scenario reproducing screen 65, the page change control unit 56 is operated according to a procedure shown in FIG. 17.

In a step S401, it is checked by the page change control unit 56 whether or not a value of the page counter is equal to the total number of page type objects in the first group. In cases where a value of the page counter is equal to the total number of page type objects in the first group, the page advancing button 64 is treated as an effective button in a step S402, and the value of the page counter is decreased by one in a step S403. In contrast, in cases where a value of the page counter is not equal to the total number of page type objects in the step S401, the procedure jumps to the step S403.

In a step S404, it is checked by the page change control unit 56 whether or not the value of the page counter is equal to 1. In cases where the value of the page counter is equal to 1, the page returning button 63 is invalidated in a step S405, and a page type object name of a particular page type object indicated by the value of the page counter is taken out from the page type object definition file corresponding to the first group of page type objects in a step S406. For example, in cases where the value of the page counter is set to N, a page type object name of an N-th page type object in the first group is taken out. In contrast, in cases where the value of the page counter is not equal to 1 in the step S404, the procedure jumps to S406.

In a step S407, a display request for requesting the display of the particular page type object indicated by the page type object name is transmitted from the page change control unit 56 to the object displaying unit 55. Therefore, the particular page type object is displayed on the page type object window 62.

Accordingly, because the page type object displayed on the page type object window 62 is changed to a next one or a previous one according to the operation of a user, an interactive property in the reproduction of the group of page type objects can be improved.

Also, because it is not required to fixedly set a display timing of each page type object, a scenario editing operation can be easily performed.

(Fourth Embodiment)

In a scenario editor according to a fourth embodiment of the present invention, page change timing for a part of the page type objects in a group is set according to the second embodiment, and any page changing timing for the remaining part of the page type objects in the group is not set.

Figures 18, 19A:
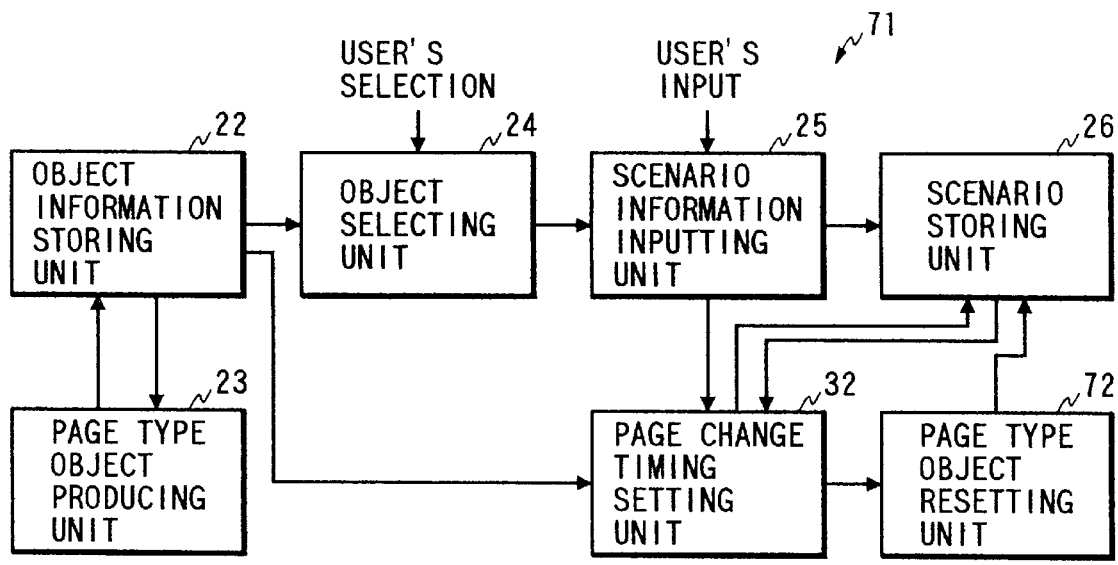
FIG. 18 is a block diagram of a scenario editor according to a fourth embodiment of the present invention.
FIG. 19A is an example of object managing information of intermediate scenario information changed according to the fourth embodiment.

FIG. 18 is a block diagram of a scenario reproducing apparatus according to a third embodiment of the present invention.

As shown in FIG. 18, a scenario reproducing apparatus 71 comprises the object information storing unit 22, the page type object producing unit 23, the object selecting unit 24, the scenario information inputting means 25, the scenario information storing unit 26, the page change timing setting unit 32 for setting a page change timing of one page type object for each of the page type objects in each of groups selected by the object selecting unit 24 according to the display and deletion timing of the intermediate scenario information stored in the scenario information storing unit 26 to assign a part of a plurality of page type objects in a group to a dynamic image object at desired interval and adding the page change timing to the intermediate scenario information, and a page type object resetting unit 72 for automatically resetting the remaining part of the page type objects in the group as a new group of page type objects.

In the above configuration, after a page change timing for each of a desired part of the page type objects in one group is set by the page change timing setting unit 32, the setting of the page change timing is stopped. For example, in cases where a page change timing for each of the first five page type objects in the first group is set and the setting of the page change timing is stopped, the scenario information input to the scenario information inputting means 25 is changed, and the object managing information shown in FIG. 19A, the message managing information shown in FIG.

19B and the window managing information shown in FIG. 19C are obtained and stored in the scenario information storing unit 26. Thereafter, the remaining page type objects in the first group are processed by the page type object resetting unit 72 according to a following procedure to produce final scenario information.

As shown in FIG. 20, a third page type object definition file is produced to define the remaining page type objects as a third group of page type objects. Thereafter, the individual object names of the remaining page type objects in the object managing information are rewritten to a new name "a third page type object". As a result, the object managing information shown in FIG. 21A is obtained and stored in the scenario information storing unit 26. Thereafter, the message managing information is rewritten to start the display of the third group of page type objects at a divided frame f11 and finish the display of the third group of page type objects at a divided frame f12. As a result, the message managing information shown in FIG. 21B is obtained and stored in the scenario information storing unit 26. Therefore, the final scenario information stored in the scenario information storing unit 26 is obtained.

In the final scenario information, information for the individual objects and information for the third group of page type objects are combined. Therefore, a user can reproduce a scenario relating to the information for the third group of page type objects while returning and advancing the page type object displayed on the page type object window 62 according to the third embodiment.

Accordingly, the individual objects and the page type objects can be reproduced by only the scenario reproducing apparatus 51 according to the final scenario information.

Also, a desired part of page type objects can be displayed at desired intervals, and the remaining part of page type objects can be arbitrarily displayed.

(Fifth Embodiment)

Figure 22:
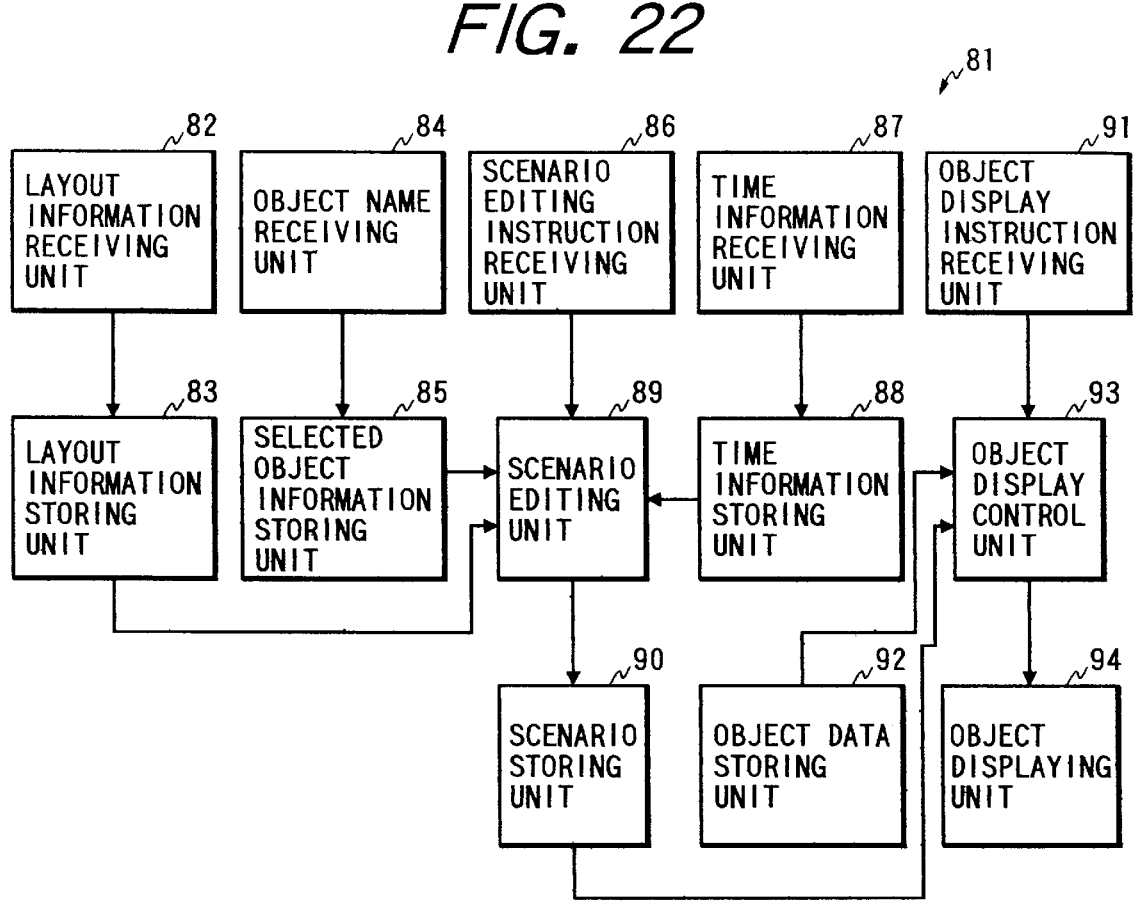
FIG. 22 is a block diagram of a hyper-video type scenario editor according to a fifth embodiment of the present invention.

FIG. 22 is a block diagram of a hyper-video type scenario editor according to a fifth embodiment of the present invention.

As shown in FIG. 22, a hyper-video type scenario editor 81 comprises a layout information receiving unit 82 embodied by the keyboard 12 for receiving layout information such as a display position and a display size for each of individual objects (static image object and text object), a layout information storing unit 83 embodied by the RAM 14 for storing the layout information received in the layout information receiving unit 82, an object name receiving unit 84 embodied by the keyboard 12 for receiving a dynamic image object name to specify a dynamic image object selected by a user as a time base and receiving one or more individual object names to specify one or more individual objects which are selected by the user and are planned to be assigned to the dynamic image object, a selected object information storing unit 85 embodied by the RAM 14 for storing dynamic image object information of the dynamic image object selected in the object name receiving unit 84 and storing individual object information of the individual objects selected in the object name receiving unit 84, a scenario editing instruction receiving unit 86 embodied by the mouse 18 for receiving a scenario editing instruction such as a display start timing setting instruction or a display finish timing setting instruction, a time information receiving unit 87 embodied by the keyboard 12 for receiving a display frame of the dynamic image, at which the display of each of the selected individual objects is started, and a deletion frame of the dynamic image, at which the display of each of the selected individual objects is finished, as time information, a time information storing unit 88 embodied by the RAM 14 for storing the time information composed of the display frame and the deletion frame for each of the selected individual objects, a scenario editing unit 89 embodied by the CPU 15 for editing a scenario by using the layout information stored in the layout information storing unit 83, the object information of the selected dynamic image object and the selected individual objects stored in the selected object information storing unit 85 and the time information of the selected individual objects stored in the time information storing unit 88 when the scenario editing instruction is received in the scenario editing instruction receiving unit 86, a scenario storing unit 90 embodied by the hard disk 17 for storing the scenario edited in the scenario editing unit 89, an object display instruction receiving unit 91 embodied by the mouse 18 for receiving an object display instruction, an object data storing unit 92 embodied by the hard disk 17 for storing data of a plurality of dynamic image objects respectively specified by one dynamic image object name and data of a plurality of individual objects respectively specified by one individual object name;

an object display control unit 93 embodied by the CPU 15 for reading out data of the selected dynamic image object and data of the selected individual objects from the object data storing unit 92 according to the scenario stored in the scenario storing unit 90 and controlling the display of the selected individual objects displayed with the selected dynamic image object according to the scenario when the object display instruction is received in the object display instruction receiving unit 91, and an object displaying unit 94 embodied by the display 16 for displaying the selected individual objects with the selected dynamic image object under the control of the object display control unit 93 to check the scenario.

Figure 23:
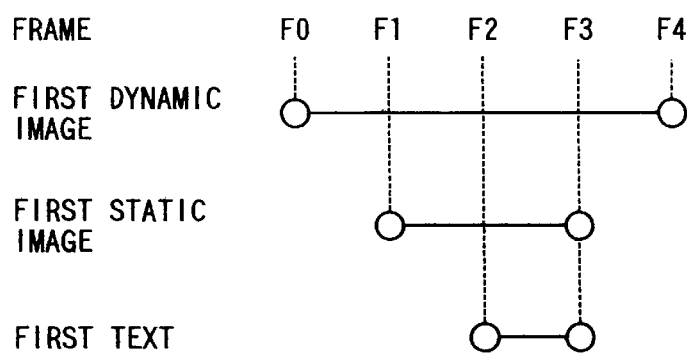
FIG. 23 shows a configuration of a scenario edited in the scenario editor shown in FIG. 22.

In the above configuration, an operation for editing a scenario of which a configuration is shown in FIG. 23 is described with reference to FIG. 24.

Figure 24:
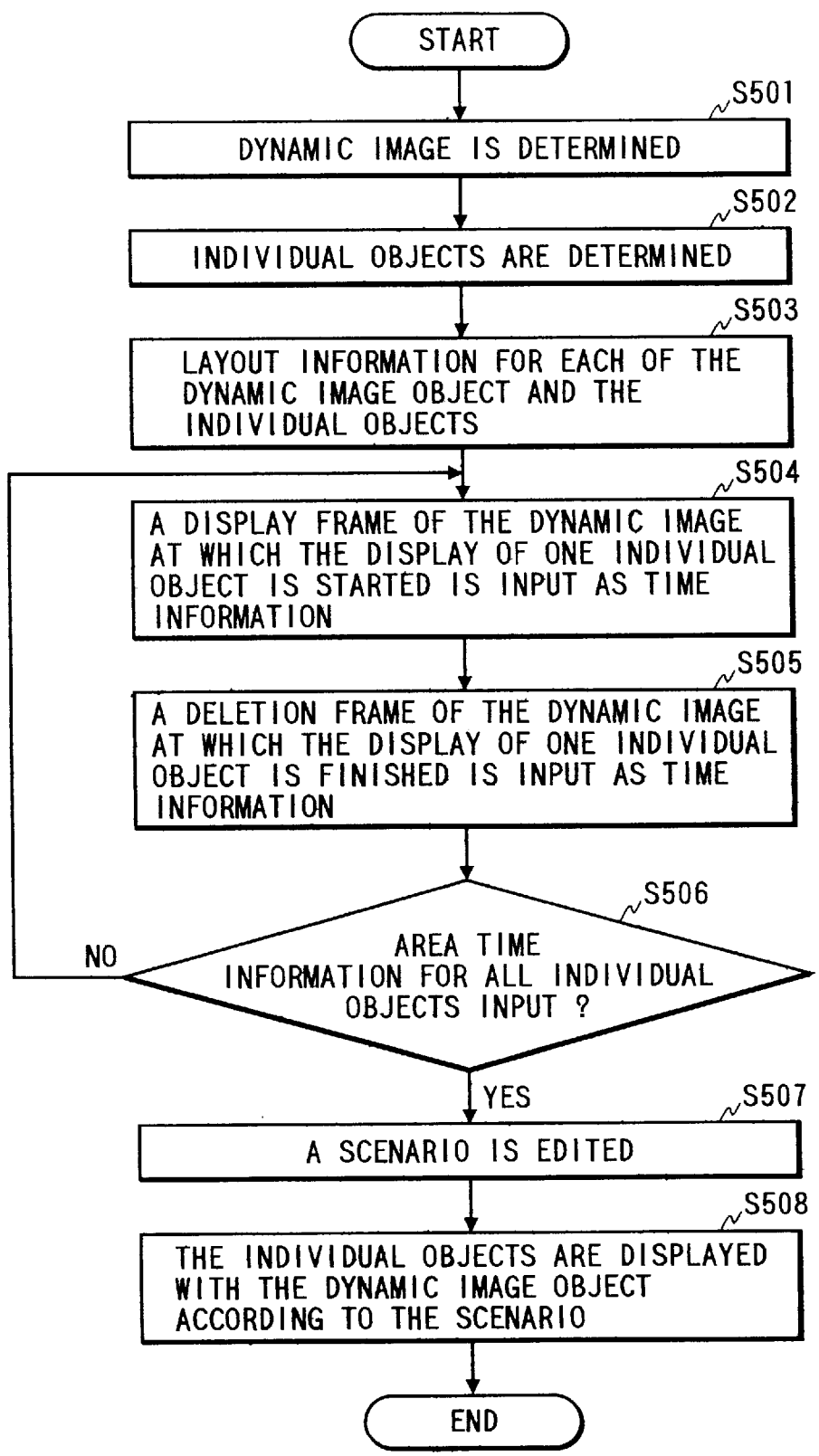
FIG. 24 is a flow chart showing a procedure of a scenario editing operation performed in the hyper-video type scenario editor shown in FIG. 22.

FIG. 24 is a flow chart showing a procedure of a scenario editing operation performed in the hyper-video type scenario editor 81.

In a step S501, a user inputs a name "first dynamic image" of a selected dynamic image object to the object name receiving unit 84 to determine a plurality of frames of dynamic image used as a time-base.

In a step S502, the user inputs a plurality of object names "first static image" and "first text" to the object name receiving unit 84 to determine a plurality of selected individual objects planned to be assigned to the dynamic image.

An example of dynamic image object information and individual object information for the dynamic image object and the individual objects selected by the user is shown in FIG. 25. When an object name specifying an individual object is input to the receiving unit 84, individual object information composed of an object identification number of the individual object, the object name, a window identification number indicating a window for displaying the individual object and an attribute indicating a data type of the individual object are stored in the selected object information storing unit 85.

In a step S503, the user inputs layout information such as a display position and a display size to the layout information receiving unit 82 for each of the selected dynamic image object and the selected individual objects, and the layout information is stored in the layout information storing unit 83. An example of the layout information for the selected dynamic image object and the selected individual objects is shown in FIG. 26.

In a step S504, the user inputs a display frame F1 of the selected dynamic image, at which the display of the first static image is started, to the time information receiving unit 87 as time information.

In a step S505, the user inputs a deletion frame F3 of the selected dynamic image, at which the display of the first static image is finished, to the time information receiving unit 87 as time information. The steps S504 and S505 are repeated to input a display frame F2 of dynamic image at which the display of the first text is started and the deletion frame F3 of dynamic image at which the display of the first text is finished to the time information receiving unit 87 as time information. In cases where the time information for all selected individual objects are input to the time information receiving unit 87 (step S506), the time information are stored in the time information storing unit 88. An example of the time information stored in the time information storing unit 88 is shown in FIG. 27.

In a step S507, the user inputs a scenario editing instruction to the scenario editing instruction receiving unit 86. Therefore, a scenario shown in FIG. 23 is edited according to the layout information stored in the layout information storing unit 83, the individual object information stored in the selected object information storing unit 85 and the time information stored in the time information storing unit 88, and the edited scenario is stored in the scenario storing unit 90.

In a step S508, when the user inputs an object display instruction to the object display instruction receiving unit 91, data of the selected dynamic image object and data of the selected individual objects are read out from the object data storing unit 92 under the control of the object display control unit 93, and the selected individual objects are displayed with the selected dynamic image object on the object displaying unit 94 according to the scenario stored in the scenario storing unit 90 under the control of the object display control unit 93.

An example of the edited scenario stored in the scenario storing unit 90 is shown in FIGS. 28A to 28D. Title managing information for managing a configuration of the edited scenario is shown in FIG. 28A, object managing information for indicating the individual object information used in the scenario is shown in FIG. 28B, message managing information for indicating a relationship between the selected individual objects and the time information is shown in FIG. 28C, and window managing information for indicating the layout information used in the scenario is shown in FIG. 28D.

A title name of the title managing information denotes a name of a series of frames of images (called a title) which are respectively composed of a dynamic image and a plurality of individual objects assigned to the dynamic image, an object number denotes the number of dynamic and individual objects used in the title, a message number denotes the number of display and deletion frames for all individual objects used in the title, a dynamic image window number denotes the number of windows used for the dynamic image, a static image window number denotes the number of windows used for one or more static images used in the title, and a text window number denotes the number of windows used for one or more texts used in the title.

An object identification number of the object managing information is attached to each of the dynamic image objects and individual objects to identify each of the objects. Timing of the message managing information indicates the numbers of the frames of dynamic image.

Accordingly, because the user can selects one or more individual objects by inputting names of the individual objects, the user can input the layout information of each individual object by specifying each object name, and the user can inputs the display timing and the deletion timing for each individual object by specifying each object name. Therefore, the scenario can be automatically edited according to the individual object information of each individual object selected by the user, the layout information of the selected individual objects and the time information of each individual object selected by the user even though the user doe not consider a time-axis.

(Sixth Embodiment)

FIG. 29 is a block diagram of a hyper-video type scenario editor according to a sixth embodiment of the present invention.

As shown in FIG. 29, a hyper-video type scenario editor 101 comprises an object information storing unit 102 embodied by the RAM 14 for storing pieces of dynamic image object information respectively composed of a dynamic image object name specifying a dynamic image object and a dynamic image management identification number, storing pieces of individual object information respectively composed of an individual object name specifying an individual object and an individual object management identification number and storing data of representative images of the dynamic image objects and the individual objects, the object data storing unit 92, a list displaying unit 103 embodied by the display 16 for displaying the representative images of the dynamic image objects and the individual objects stored in the object information storing unit 102 in a list form, a layout information storing unit 104 embodied by the RAM 14 for storing layout information indicating a display position and a display size for each of the individual objects stored in the object data storing unit 92, an object selecting unit 105 embodied by the mouse 18 for selecting one dynamic image object and one or more individual objects by inputting one dynamic image object name and one or more individual object names while referring the representative images displayed by the list displaying unit 103, a selected object displaying unit 106 embodied by the display 16 for reading out data of the dynamic image object and the individual objects selected by the object selecting unit 104 from the object data storing unit 92 and displaying the selected dynamic image object and the selected individual objects according to the layout information stored in the layout information storing unit 104, a selected object information storing unit 107 embodied by the RAM 14 for storing dynamic image object information of the dynamic image object and individual object information of the individual objects selected in the object selecting unit 105, a scenario editing instruction receiving unit 112 for receiving a display start timing and a display finish timing for each of the individual objects selected in the object selecting unit 105, a reproducing and stopping instruction receiving unit 108 embodied by the mouse 18 for receiving a reproducing instruction or a stopping instruction to advance the display of a frame of dynamic image to a next frame or stop the display of the dynamic image, a dynamic image reproducing unit 109 embodied by the CPU 15 for reproducing the dynamic image according to the reproducing instruction received in the reproducing and stopping instruction receiving unit 108 to advance a frame of dynamic image displayed by the selected object displaying unit 106 to a succeeding frame and stopping the reproduction of the dynamic image according to the stopping instruction received in the reproducing and stopping instruction receiving unit 108 to maintain the display of the succeeding frame, a time information detecting unit 110 embodied by the CPU 15 for detecting the succeeding frame of dynamic image reproduced in the dynamic image reproducing unit 109 as a piece of time information, a scenario editing unit 111 embodied by the CPU 15 for editing a scenario by using the layout information stored in the layout information storing unit 104, the dynamic image and individual object information of the selected dynamic image and individual objects stored in the selected object information storing unit 107 and the time information detected in the time information detecting unit 110 when the scenario editing instruction is received in the scenario editing instruction receiving unit 112, the scenario storing unit 90, the object display instruction receiving unit 91 and the object display control unit 93.

As shown in FIG. 30, the selected object displaying unit 106 has an image screen 122, and the image screen 122 comprises a dynamic image displaying screen 113 for displaying the dynamic image, a static image displaying screen 114 for displaying the static image object and a text displaying screen 115 for displaying the text object. In this case, The layout information such as a display position and a display size for each object displayed on the screen 113, 114 or 115 is fixed. Therefore, a user does not required to input any layout information, so that a scenario editing operation can be simplified.

The reproducing and stopping instruction receiving unit 108 comprises a reproduction button 116 for changing a frame of dynamic image displayed on the dynamic image displaying screen 113 to a next frame, and a stop button 117 for stopping the change of the frame of dynamic image displayed on the dynamic image displaying screen 113.

The scenario editing instruction receiving unit 112 comprises a display start timing setting button 118 for setting a display start timing for each of the selected individual objects and a display finish timing setting button 119 for setting a display finish timing for each of the selected individual objects.

The list displaying unit 103 comprises an object list display screen 120 for displaying a list of objects for each of attributes, and three display object changing buttons 121 for changing an attribute of objects displayed on the object list display screen 120.

In the above configuration, an operation performed in the hyper-video type scenario editor 101 is described with reference to FIG. 31.

FIG. 31 is a flow chart showing a display timing setting operation performed in the reproducing and stopping instruction receiving unit 108 according to the sixth embodiment.

In a step S511, a user selects a series of frames of dynamic image used as a time base in the object selecting unit 105 by inputting a dynamic image object name specifying the dynamic image object.

In a step S512, when the user pushes the reproduction button 116, data of the selected dynamic image object is transferred from the object data storing unit 92 to the selected object displaying unit 106, and the dynamic image is displayed on the dynamic image displaying screen 113.

In a step S513, when a particular frame of the dynamic image at which the display of an individual object is started is displayed on the dynamic image displaying screen 113, the user pushes the stop button 117 to maintain the display of the particular frame of dynamic image.

In a step S514, when the user selects an individual object in the object selecting unit 105, data of the selected individual object is transferred from the object data storing unit 92 to the selected object displaying unit 106, and the individual object is displayed on the static image or text displaying screen 114 or 115.

In a step S515, it is judged by the user which of a display start timing and a display finish timing is to be set.

In a step S516, the user pushes the display start timing setting button 118 in cases where the setting of the display start timing is selected in the step S515. Therefore, the display start timing for the selected individual object is set to the particular frame of dynamic image. That is, the display of the selected individual object is started at the particular frame of dynamic image.

In a step S517, the user pushes the display finish timing setting button 119 in cases where the setting of the display finish timing is selected in the step S515. Therefore, the display finish timing for the selected individual object is set to the particular frame of dynamic image. That is, the display of the selected individual object is finished at the particular frame of dynamic image.

In a step S518, it is judged by the user whether the display start timing and the display finish timing for all individual objects desired by the user to be selected in the object selecting unit 105 are set. In cases where the setting of the display start timing and the display finish timing is not finished, the steps S513 to S517 are repeated.

An example of the above display timing setting operation performed to edit a scenario shown in FIG. 23 is described with reference to FIGS. 32 and 33.

Figure 33A:
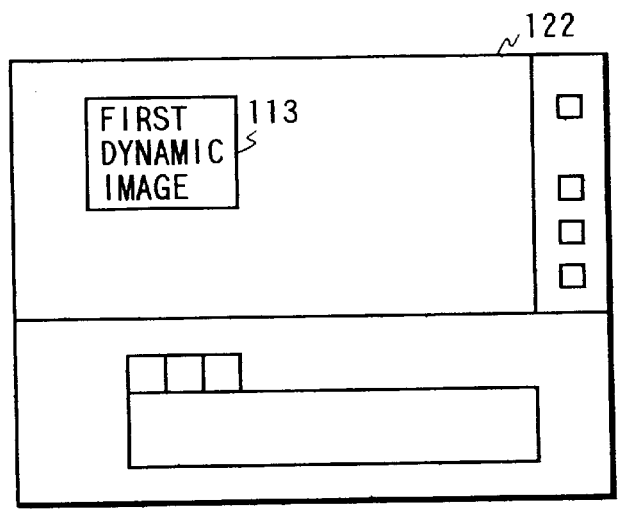
FIGS. 33A to 33C respectively show an image view of an image screen in a selected object displaying unit of the scenario editor shown in FIG. 29.
Figure 33B:
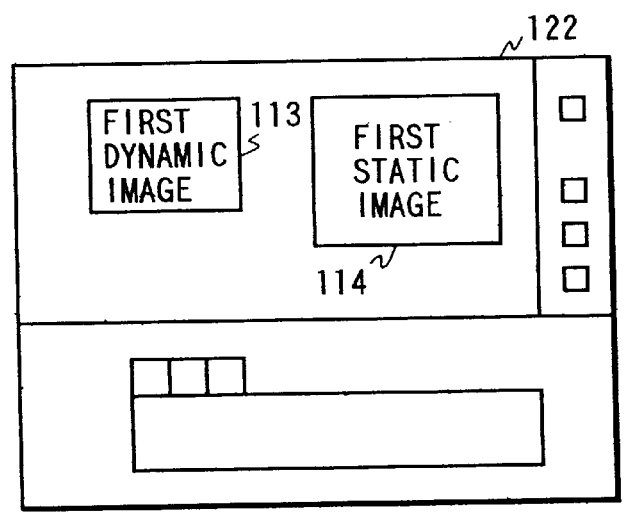
Figure 33C:
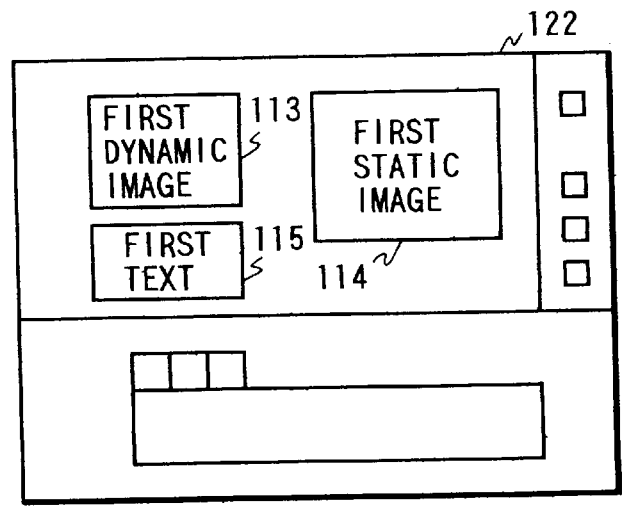

FIG. 32 is a flow chart of a display timing setting operation performed by the user, and FIGS. 33A to 33C respectively show an image view of the image screen 122 of the selected object displaying unit 106.

In a step S521, when the user selects the first dynamic image in the object selecting unit 105, as shown in FIG. 33A, a top frame F0 of first dynamic image is displayed on the dynamic image displaying screen 113.

In a step S522, the first dynamic image is reproduced, and the reproduction of the first dynamic image is stopped at a frame F1 of the first dynamic image.

In a step S523, the user selects the first static image in the object selecting unit 105, so that the first static image is displayed on the static image displaying screen 114 as shown in FIG. 33B.

In a step S524, the display start timing setting button 118 is pushed, so that the display start timing for the first static image is set to the frame F1.

In a step S525, the reproduction of the first dynamic image is again performed and is stopped at a frame F2 of the first dynamic image.

In a step S526, the user selects the first text in the object selection unit 105, so that the first text is displayed on the text displaying screen 115 as shown in FIG. 33C.

In a step S527, the display start timing setting button 118 is pushed, so that the display start timing for the first text is set to the frame F2.

In a step S528, the reproduction of the first dynamic image is again performed and is stopped at a frame F3 of the first dynamic image.

In a step S529, the user again selects the first static image.

In a step S530, the display finish timing setting button 119 is pushed, so that the display finish timing for the first static image is set to the frame F3.

In a step S531, the user again selects the first text.

In a step S532, the display finish timing setting button 119 is pushed, so that the display finish timing for the first text is set to the frame F3.

Therefore, the user can perform the display timing setting operation while observing the dynamic image and the individual images displayed on the image screen 122.

Next, an operation for selecting the dynamic image object and one or more individual objects in the steps S511 and S514 is described in detail.

FIG. 34 shows an example of object information stored in the object information storing unit 102.

As shown in FIG. 34, a dynamic image object name is attached to each of dynamic image objects, and each dynamic image object is identified by a dynamic image management identification number. Also, a static image object name is attached to each of static image objects, and each static image object is identified by a static image management identification number. Also, a text object name is attached to each of text objects, and each text object is identified by a text management identification number. Therefore, the objects stored in the object information storing unit 102 are managed by using the management identification numbers.

In the list displaying unit 103, pieces of object information stored in the object information storing unit 102 are referred, a plurality of object names are taken out in the order of increasing the management object number for each attribute, and a representative image indicating each of the objects specified by the object names is displayed. In case of the dynamic image object information, a frame of representative static image representing each dynamic image object is displayed. The representative static images of the dynamic image objects are stored in the object information storing unit 102 in advance, and each representative static image is specified by one dynamic image object name. In case of static image object information, reduced data of each static image object is displayed. In case of text object information, a text title and predetermined data called an icon are displayed for each text object.

Thereafter, a user selects one dynamic image object and one or more individual objects in the object selecting unit 105 while observing the representative static images displayed by the list displaying unit 103 in a list form. In this case, because the list displaying unit 103 is embodied by the mouse 18, an indicating arrow is placed on each representative static image, and the mouse 18 is clicked. Also, it is applicable that a touch panel be used in place of the mouse 18. In this case, each representative static image is indicated by user's finger to select each object.

Thereafter, the objects selected by the user are displayed on the displaying screen 114 or 115 by the selected object displaying unit 107. That is, the object information of the selected objects are read out from the object information storing unit 102, the layout information of the selected objects are read out from the layout information storing unit 104, and each of the selected individual objects is displayed on the displaying screen 114 or 115 at a fixed position and a fixed size.

FIG. 35 shows an example of the layout information stored in the layout information storing unit 104. As shown in FIG. 35, position information composed of X and Y coordinates and size information composed of a width and a height are stored in advance for each attribute. That is, the layout information for all dynamic images is predetermined, the layout information for all static images is predetermined, and the layout information for all texts is predetermined.

Pieces of object information of the objects selected by the user in the object selecting unit 105 are stored in the selected object information storing unit 107. Because the pieces of object information are used to assign each of the individual objects to one frame of dynamic image, the pieces of object information stored in the selected object information storing unit 107 are deleted after the scenario is edited.

FIG. 36 shows an example of the object information stored in the selected object information storing unit 107. For example, when the user selects the first dynamic image in the step S521 of FIG. 32, the first dynamic image is displayed on the displaying screen 113, and an object identification number "O001", an object name "first dynamic image", a window identification number "dynamic image W001" and an attribute "dynamic image" are stored with contents of the first dynamic image in the selected object information storing unit 107. Also, when the user selects the first static image or the first text in the step S523 or S526 of FIG. 32, the first static image or the first text is displayed on the displaying screen 114 or 115, and an object identification number "O001", an object name "first static image" or "first text", a window identification number "static image W001" or "text W001" and an attribute "static image" or "text" are stored with contents of the first static image or the first text in the selected object information storing unit 107.

Next, an operation for reproducing a dynamic image object in the step S513 is described in detail.

In cases where a reproducing instruction is input to the reproducing and stopping instruction receiving unit 108 by the user, the dynamic image selected in the object selecting unit 105 is reproduced by the dynamic image reproducing unit 109. Also, in cases where a stopping instruction is input to the reproducing and stopping instruction receiving unit 108 by the user, the display of the dynamic image is stopped at a particular frame of dynamic image by the dynamic image reproducing unit 109, and the particular frame is stored in the time information detecting unit 110 as time information.

Next, an operation for setting the display start timing or the display finish timing in the step S516 or S517 is described in detail.

When the user inputs a scenario editing instruction to the scenario editing instruction receiving unit 112, a scenario is edited in the scenario editing unit 111.

Figure 37:
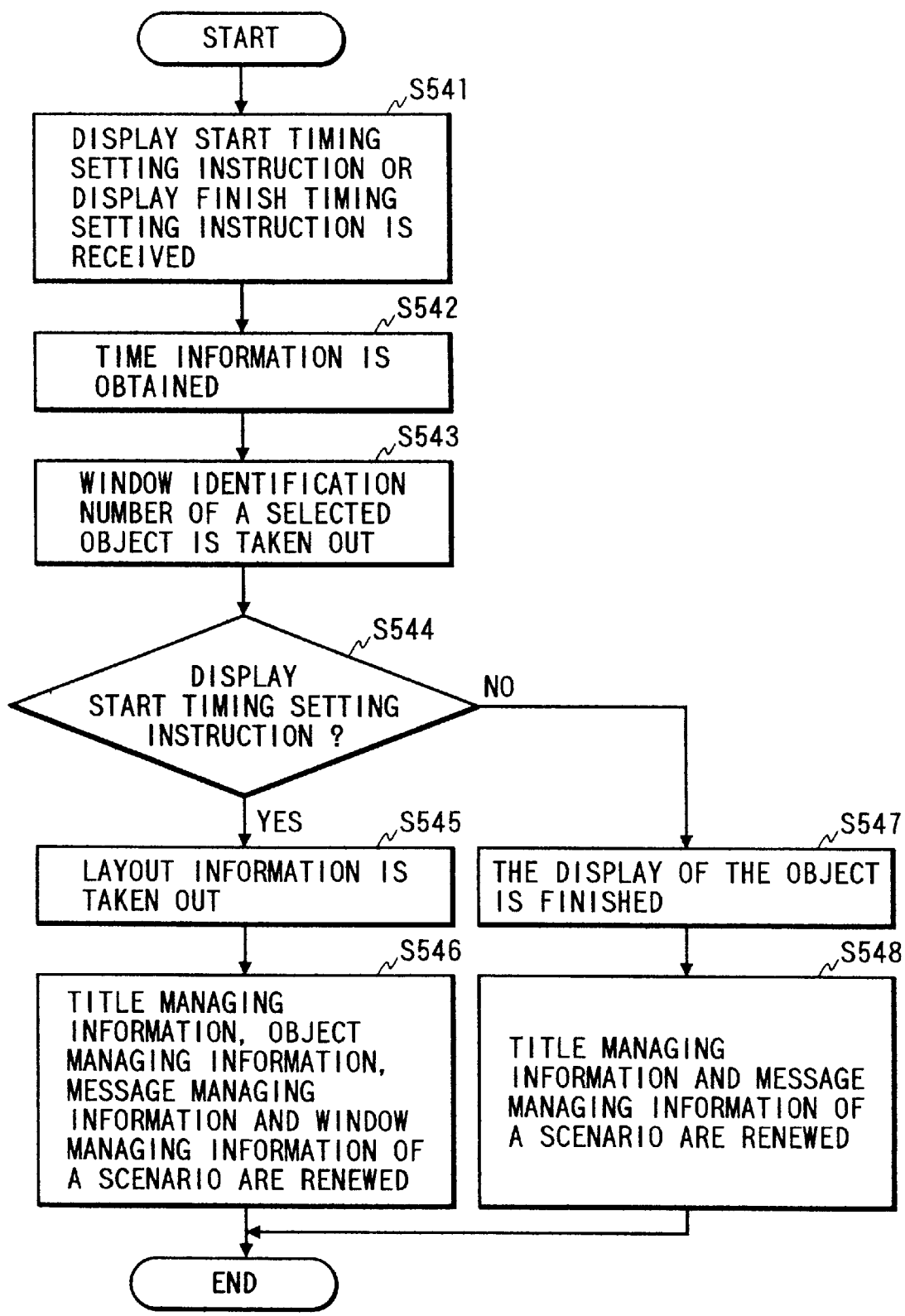
FIG. 37 is a flow chart showing a scenario editing operation performed in a scenario editing unit of the scenario editor shown in FIG. 29.

FIG. 37 is a flow chart showing a scenario editing operation performed in the scenario editing unit 111.

In a step S541, when the display start timing setting button 118 or the display finish timing setting button 119 is pushed by the user, a display start timing setting instruction or a display finish timing setting instruction is received in the scenario editing instruction receiving unit 112 and is transmitted to the scenario editing unit 111.

In a step S542, time information is obtained from the time information detecting unit 110.

In a step S543, a window identification number corresponding to the object selected in the step S514 is taken out from the selected object information storing unit 107.

In a step S544, it is judged by the scenario editing unit 111 which of the display start timing setting instruction and the display finish timing setting instruction is received.

In a step S545, in cases where the display start timing setting instruction is received in the step S541, layout information corresponding to the window identification number is taken out from the layout information storing unit 104. For example, in cases where the window identification number "dynamic image W001" is taken out in the step S543, the layout information composed of a width "W1", a height "H1", an X coordinate "X1" and a Y coordinate "Y1" is taken out from the layout information storing unit 104. Also, the object information corresponding to the object selected in the step S514 is received from the selected object information storing unit 107.

In a step S546, title managing information, object managing information, message managing information and window managing information of a scenario are renewed according to the time information, the object information and the layout information.

In a step S547, in cases where the display finish timing setting instruction is received in the step S541, the display of the object corresponding to the window identification number is finished.

In a step S548, title managing information and message managing information of a scenario are renewed.

In cases where the steps S541 to S548 are finished for all objects selected in the object selecting unit 105, the title managing information, the object managing information, the message managing information and the window managing information renewed in the steps S546 and S548 are stored in the scenario storing unit 90 as an edited scenario.

For example, in case where the display star timing for the first static image is set in the step S524 of FIG. 32, as shown in FIG. 38, the title managing information, the object managing information, the message managing information and the window managing information renewed in the step S546 are obtained. Also, in cases where the display finish timing for the first static image is set in the step S530 of FIG. 32, the title managing information and the message managing information are renewed in the step S548, and the title managing information, the object managing information, the message managing information and the window managing information shown in FIG. 39 are obtained.

After the scenario is edited, when an object display instruction is input to the object display instruction receiving unit 91 by the user, the scenario stored in the scenario storing unit 90 is taken out to the object display control unit 93, and the dynamic image object and the individual objects assigned to the dynamic image object are displayed on the displaying screen 113 under the control of the object display control unit 93.

Accordingly, when a dynamic image object or an individual object is selected in the object selecting unit 105, because the dynamic image object or the individual object is immediately displayed on the displaying screen 113, 114 or 115 according to the layout information stored in the layout information storing unit 104, the user can check how the dynamic image object or the individual object is shown on the displaying screen 113, 114 or 115.

Also, after the display finish timing for each of all selected individual objects is set, the display of the individual objects on the displaying screen 113 or 114 is finished, and the dynamic image object and the individual objects assigned to the dynamic image object are displayed on the displaying screen 113. Therefore, even though the user does not perform an displayed image changing operation, the user can easily check how the dynamic image is reproduced with the individual objects assigned to the dynamic image object.

(Seventh Embodiment)

Figure 40:
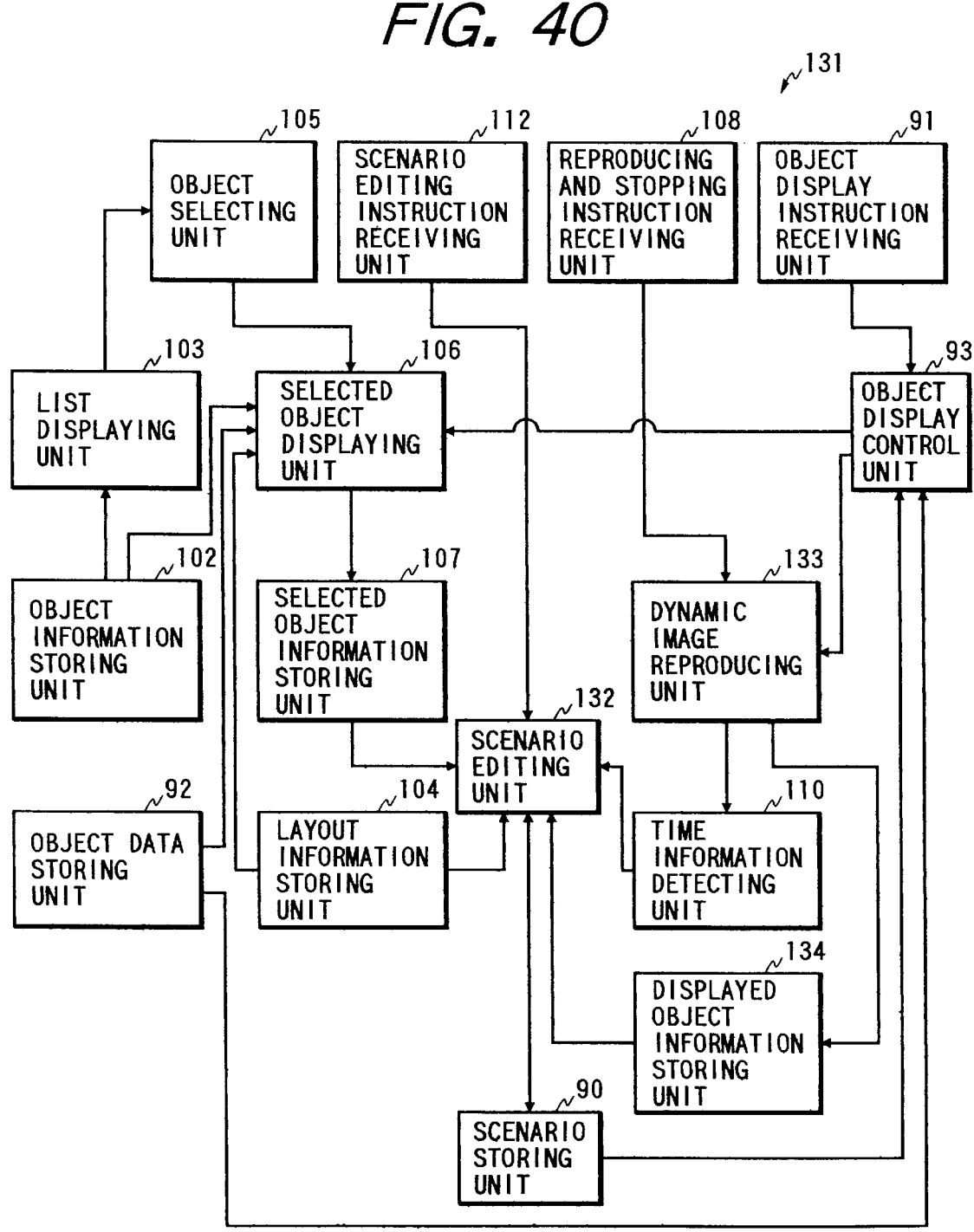
FIG. 40 is a block diagram of a hyper-video type scenario editor according to a seventh embodiment of the present invention.

FIG. 40 is a block diagram of a hyper-video type scenario editor according to a seventh embodiment of the present invention.

As shown in FIG. 40, a hyper-video type scenario editor 131 comprises the object information storing unit 102, the object data storing unit 92, the list displaying unit 103, the layout information storing unit 104, the object selecting unit 105, the selected object displaying unit 106, the selected object information storing unit 107, the scenario editing instruction receiving unit 112, the time information detecting unit 110, a scenario editing unit 132 embodied by the CPU 15 for editing a scenario by using the layout information stored in the layout information storing unit 104, the dynamic image and individual object information of the selected dynamic image and individual objects stored in the selected object information storing unit 107 and the time information detected in the time information detecting unit 110 when the scenario, editing instruction is received in the scenario editing instruction receiving unit 112 and altering the scenario, the scenario storing unit 90, the reproducing and stopping instruction receiving unit 108 for receiving a reproducing instruction or a stopping instruction to advance the display of a frame of dynamic image to a next frame or stop the display of the dynamic image and receiving a returning instruction to return a frame of dynamic image displayed on the displaying screen 113, a dynamic image reproducing unit 133 embodied by the CPU 15 for reproducing the dynamic image according to the reproducing instruction received in the reproducing and stopping instruction receiving unit 108 to advance a frame of dynamic image displayed on the displaying screen 113 to a succeeding frame, adversely reproducing the dynamic image according to the returning instruction received in the reproducing and stopping instruction receiving unit 108 to return a frame of dynamic image displayed on the displaying screen 113 to a previous frame and stopping the reproduction of the dynamic image according to the stopping instruction received in the reproducing and stopping instruction receiving unit 108 to maintain the display of the succeeding or previous frame, a displayed object information storing unit 134 for storing object information of one or more individual objects which are displayed on the displaying screens 114 and/or 115 at the succeeding or previous frame of dynamic image, the object display instruction receiving unit 91 and the object display control unit 93.

Figure 41A:
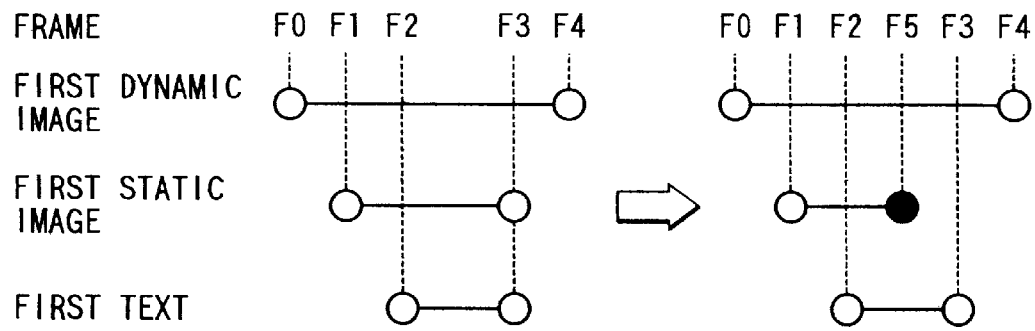
FIG. 41A shows a first example in which a scenario stored in a scenario storing unit of the scenario editor shown in FIG. 40 is altered by changing a display finish timing for one individual object.
Figure 41B:
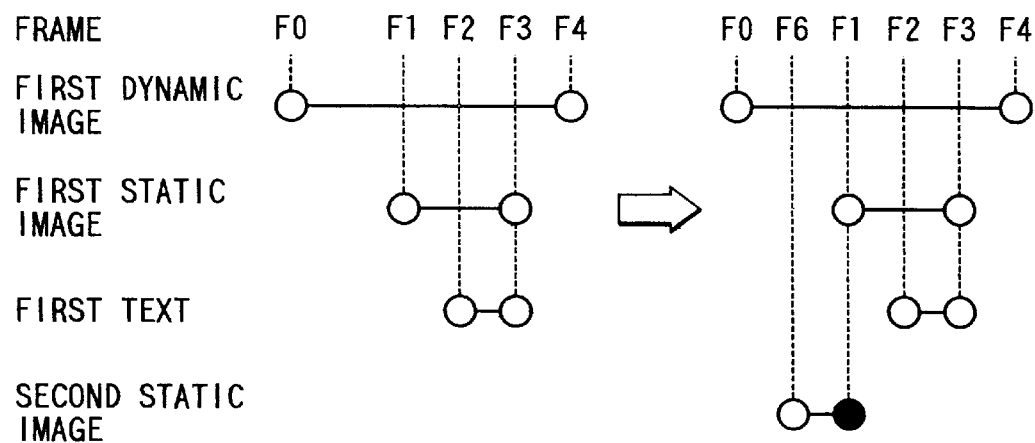
FIG. 41B shows a second example in which a scenario stored in the scenario storing unit is altered by adding a new individual object.
Figure 41C:
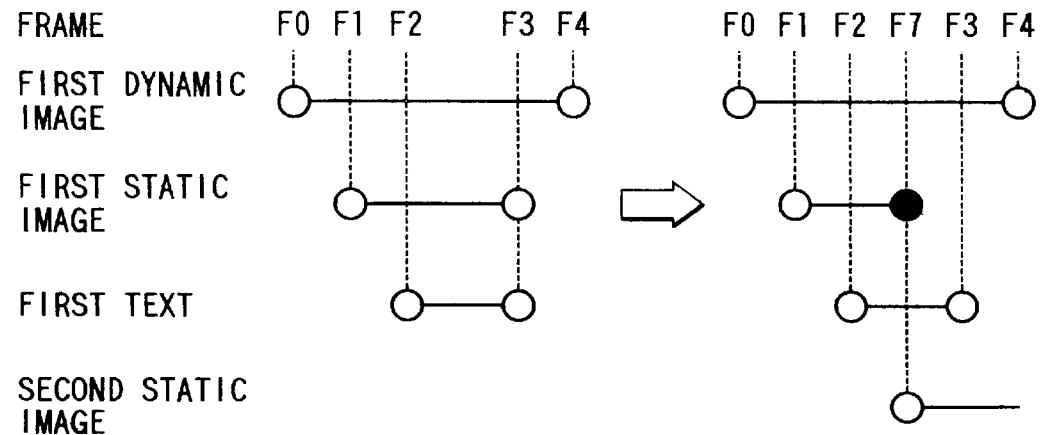
FIG. 41C shows a third example in which a scenario stored in the scenario storing unit is altered by adding a new individual object.

In the above configuration, a first example in which a scenario stored in the scenario storing unit 90 is altered by changing the display finish timing for one individual object is shown in FIG. 41A, a second example in which a scenario stored in the scenario storing unit 90 is altered by adding a new individual object of which an attribute is the same as that of one present individual object used in the scenario on condition that a display start timing for the new individual object is earlier than that of the present individual object is shown in FIG. 41B, and a third example in which a scenario stored in the scenario storing unit 90 is altered by adding a new individual object of which an attribute is the same as that of one present individual object used in the scenario on condition that a display start timing for the new individual object is later than that of the present individual object is shown in FIG. 41C.

In the first example shown in FIG. 41A, after the scenario shown in FIG. 23 is edited, a returning instruction is input to the reproducing and stopping instruction receiving unit 108, a frame of the first dynamic image is returned to a frame F5 placed between the frames F2 and F3 according to the returning instruction, and the display finish timing for the first static image is changed from the frame F3 to the frame F5.

In the second example shown in FIG. 41B, after the scenario shown in FIG. 23 is edited, a returning instruction is input to the reproducing and stopping instruction receiving unit 108, a frame of the first dynamic image is returned to a frame F6 preceding to the frame F1 according to the returning instruction, and a display start timing for a second static image is set. Because the layout information is fixed for each of the attributes, two or more individual objects of the same attribute are not displayed at the same frame. Therefore, because the display start timing for the first static image object of which the attribute is the same as that of the second static image has been already set to the frame F1, a display finish timing for the second static image object is automatically set to the frame F1.

In the third example shown in FIG. 41C, after the scenario shown in FIG. 23 is edited, a returning instruction is input to the reproducing and stopping instruction receiving unit 108, a frame of the first dynamic image is returned to a frame F7 placed between the frames F2 and F3, and a display start timing for a second static image is set to the frame F7. In this case, because the display start timing and the display finish timing for the first static image object have been already set to display the first static image at the frame F7, the display finish timing for the first static image object is automatically set to the frame F7.

When a user inputs a returning instruction to the reproducing and stopping instruction receiving unit 108, the frame of the dynamic image displayed on the displaying screen 113 is returned by the dynamic image reproducing unit 133. Thereafter, when the user inputs a stopping instruction to the reproducing and stopping instruction receiving unit 108, the reproduction of the dynamic image is stopped, and a particular frame of dynamic image is displayed on the displaying screen 113. In this case, one or more pieces of individual object information of one or more individual objects displayed on the displaying screens 114 and/or 115 at the particular frame are stored in the displayed object information storing unit 134.

For example, in cases where the dynamic image is reproduced according to the scenario shown in FIG. 23 and the reproduction of the dynamic image is stopped at a particular frame between the frames F1 and F2, because the first static image is only displayed with the dynamic image at the particular frame, the object information shown in FIG. 42A is stored in the displayed object information storing unit 134. Also, in cases where the dynamic image is reproduced according to the scenario shown in FIG. 23 and the reproduction of the dynamic image is stopped at a particular frame between the frames F2 and F3, because the first static image and the first text are displayed with the dynamic image at the particular frame, the object information shown in FIG. 42B is stored in the displayed object information storing unit 134.

Next, a scenario editing operation performed in the scenario editing unit 132 is described.

FIG. 43 is a flow chart of a scenario editing operation performed in the scenario editing unit 132.

When a user inputs a scenario editing instruction to the scenario editing instruction receiving unit 112 (step S601), a current frame of dynamic image displayed on the displaying screen 113 is transmitted as time information from the time information detecting unit 110 to the scenario editing unit 132 (step S602). Thereafter, it is judged by the scenario editing unit 132 whether or not the scenario editing instruction is a display start timing setting instruction for instructing to set a display start timing for a particular individual object to the current frame (step S603). In cases where the display start timing setting instruction is received in the scenario editing unit 132, a window identification number for the particular individual object is transferred from the selected object information storing unit 107 to the scenario editing unit 132 (step S604). Thereafter, layout information for the particular individual object is transferred from the layout information storing unit 104 to the scenario editing unit 132 (step S605). Thereafter, the time information, the object information and the layout information are added to title managing information, object managing information, message managing information and window managing information of a scenario, and the scenario is output to the scenario storing unit 90 (step S606). That is, the display start timing for the particular individual object is set to the current frame in the scenario.

Thereafter, a previous individual object of which a display start timing is set to a frame preceding to the current frame is retrieved on condition that an attribute of the previous individual object is the same as that of the particular individual object. That is, an attribute of the particular individual object is retrieved from the message managing information of the scenario, the message managing information is searched in a past direction for the previous individual object (step S607), and it is judged whether or not the previous individual object exists (step S608). In cases where the previous individual object is found out, a display finish timing for the previous individual object is automatically set to the current frame to alter the title managing information and the message managing information of the scenario (step S609), and a searching operation for the previous individual object is finished.

For example, as shown in FIG. 41C, in cases where the display start timing for the particular individual object "second static image object" is set to the current frame F7, the message managing information is searched, and it is detected that the display start timing for the previous individual object "first static image object" is set to the frame F1, and a display finish timing for the previous individual object "first static image object" is set to the frame F7.

Thereafter, a previous individual object of which a display start timing is set to a frame succeeding to the current frame is retrieved on condition that an attribute of the previous individual object is the same as that of the particular individual object. That is, an attribute of the particular individual object is retrieved from the message managing information of the scenario, the message managing information is searched in a future direction for the previous individual object (step S610), and it is judged whether or not the previous individual object exists (step S611). In cases where the previous individual object is found out, a display finish timing for the particular individual object is automatically set to a frame at which the display start timing for the previous individual object is set to alter the title managing information and the message managing information of the scenario (step S612), and a searching operation for the previous individual object is finished.

For example, as shown in FIG. 41B, in cases where the display start timing for the particular individual object "second static image object" is set to the current frame F6, the message managing information is searched, and it is detected that the display start timing for the previous individual object "first static image object" is set to the frame F1, and a display finish timing for the particular individual object "second static image object" is set to the frame F1.

Thereafter, the title managing information and the message managing information of the scenario altered in the steps S609 and S612 are output to the scenario storing unit 90 (step S618), and the scenario stored in the scenario storing unit 90 is renewed (step S619).

In contrast, in cases where a display finish timing setting instruction for instructing to change a display finish timing for a particular individual object displayed on the displaying screen 114 or 115 to the current frame is received in the scenario editing unit 132 in the step S603, a particular window identification number for the particular individual object is transferred from the displayed object information storing unit 134 to the scenario editing unit 132 (step S613), and the particular individual object displayed on the displaying screen 114 or 115 is deleted from the displaying screen 114 (step S614). Thereafter, the message managing information of the scenario stored in the scenario storing unit 90 is searched in a future direction (S615), and it is judged whether or not a display finish timing for the particular individual object is found out (S616). In cases where a display finish timing for the particular individual object is found out, the display finish timing for the particular individual object is changed to the current frame to alter the scenario (step S617).

For example, as shown in FIG. 41A, in cases where the display finish timing for the particular individual object "first static image object" is set to the current frame F5, the message managing information is searched, and it is detected that the display finish timing for the particular individual object "first static image object" is set to the frame F3, and a display finish timing for the particular individual object "first static image object" is changed to the frame F5.

Thereafter, the message managing information of the scenario is output to the scenario storing unit 90 (step S620), and the scenario stored in the scenario storing unit 90 is renewed (step S619). Also, in cases where any display finish timing for the particular individual object is not found out in the step S616, a display finish timing for the particular individual object is set to the current frame (step S621), and the scenario stored in the scenario storing unit 90 is renewed (step S619).

Next, an example of the scenario altered by the hyper-video type scenario editor 131 is shown in each of FIGS. 44 to 45.

FIG. 44 shows an example of the message managing information of the scenario altered according to a scenario altering operation shown in FIG. 41A.

As shown in FIG. 44, the display finish timing for the first static image is changed to the frame 4.

FIG. 45 shows an example of the scenario altered according to a scenario altering operation shown in FIG. 41B.

As shown in FIG. 45, the number of objects in the title managing information is increased as compared with that shown in FIG. 28A because of the addition of the second static image object, the second static image object is added to the object managing information as compared with that shown in FIG. 28B, the display start timing and the display finish timing for the second static image object are added to the message managing information as compared with that shown in FIG. 28C, and layout information of the second static image object is added to the layout managing information as compared with that shown in FIG. 28D.

FIG. 46 shows an example of the scenario altered according to a scenario altering operation shown in FIG. 41C.

As shown in FIG. 46, the number of objects in the title managing information is increased as compared with that shown in FIG. 28A because of the addition of the second static image object, the second static image object is added to the object managing information as compared with that shown in FIG. 28B, the display start timing for the second static image object is added to the message managing information as compared with that shown in FIG. 28C, and layout information of the second static image object is added to the layout managing information as compared with that shown in FIG. 28D.

Accordingly, in cases where a particular individual object is added to a scenario stored in the scenario storing unit 90, because a frame of the dynamic image object displayed on the displaying screen 113 can be returned to a previous frame when a returning instruction is input, even though a previous individual object having the same attribute as that of the particular individual object exists in the scenario, the scenario can be altered by automatically changing a display start timing or a display finish timing for the previous individual object.

Also, in cases where a display start timing or a display finish timing for a particular individual object existing in the scenario is changed, because a frame of the dynamic image object displayed on the displaying screen 113 can be returned to a previous frame when a returning instruction is input, the scenario can be altered to change the display start timing or the display finish timing for the particular individual object.

Also, the altered scenario can be immediately checked by displaying the dynamic image with one or more individual objects under the control of the object display control unit 93.

(Eighth Embodiment)

Figure 47:
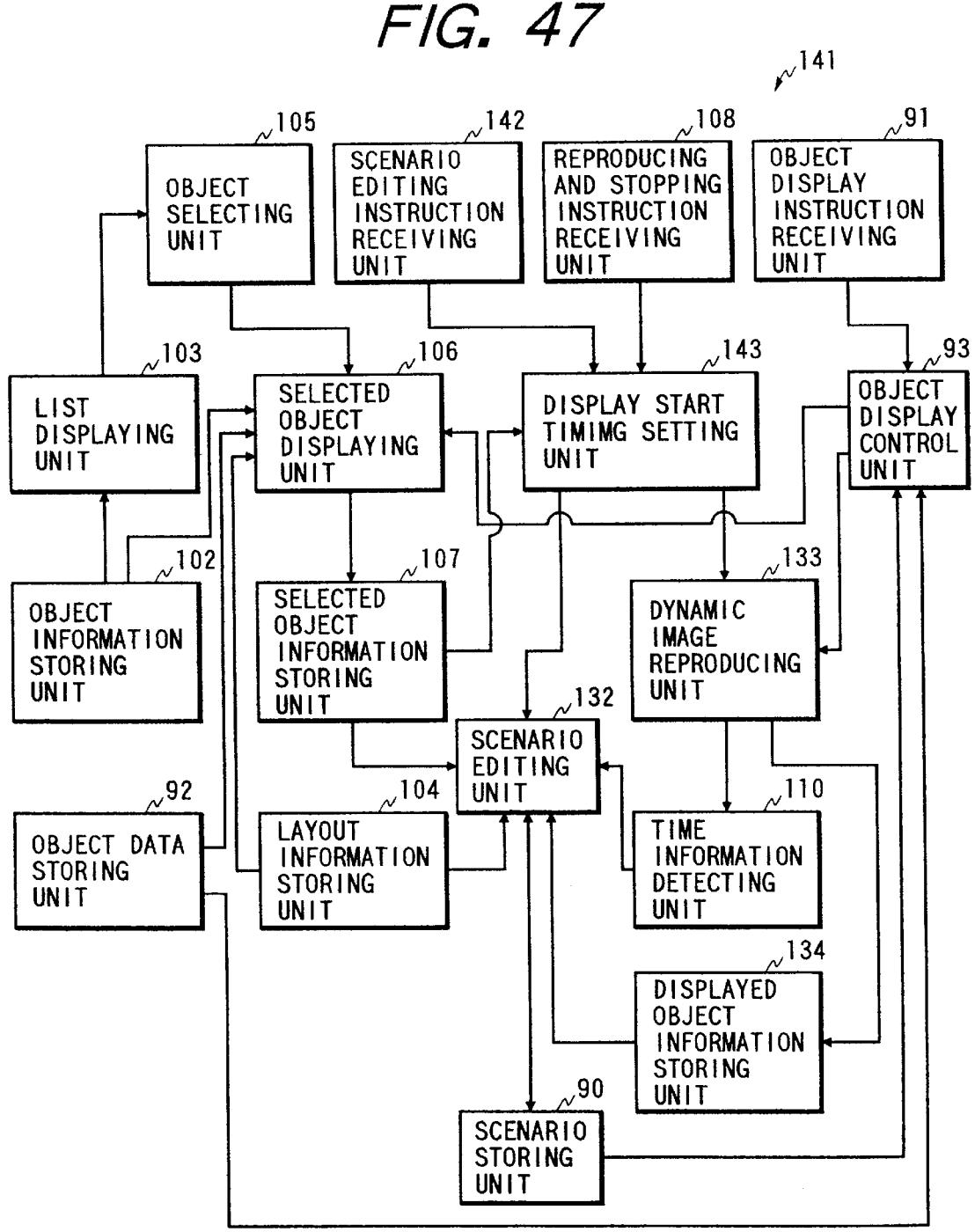
FIG. 47 is a block diagram of a hyper-video type scenario editor according to an eighth embodiment of the present invention.

FIG. 47 is a block diagram of a hyper-video type scenario editor according to an eighth embodiment of the present invention.

As shown in FIG. 47, a hyper-video type scenario editor 141 comprises
  the object information storing unit 102, the object data storing unit 92, the list displaying unit 103, the layout information storing unit 104, the object selecting unit 105, the selected object displaying unit 106, the selected object information storing unit 107,
  a scenario editing instruction receiving unit 142 embodied by the mouse 18 for receiving a display finish timing setting instruction,
  the time information detecting unit 110, the scenario editing unit 132, the scenario storing unit 90, the reproducing and stopping instruction receiving unit 108, the dynamic image reproducing unit 133, the displayed object information storing unit 134, the object display instruction receiving unit 91, the object display control unit 93, and a display start timing setting unit 143 for automatically setting a display start timing for a particular individual object by comparing a first individual object displayed on the displaying screen 114 (or 115) just after the stoppage of the reproduction of the dynamic image and a second individual object displayed on the same displaying screen 114 (or 115) just before the reproduction of the dynamic image performed after the stoppage of the reproduction of the dynamic image and instructing the scenario editing unit 132 to set the display start timing for the particular individual object in cases where the second individual object differs from the first individual object.

Figure 48:
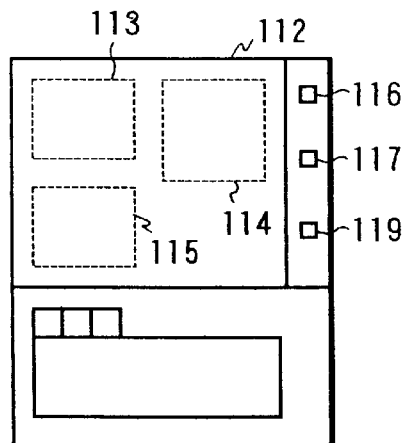
FIG. 48 shows displaying screens and buttons used in the scenario editor shown in FIG. 47.

As shown in FIG. 48, the scenario editing instruction receiving unit 142 has a display finish timing setting button 119 for setting a display finish timing for each of the selected individual objects, and any display start timing setting button is not provided for the scenario editing instruction receiving unit 142.

In the above configuration, a scenario editing operation performed in the hyper-video type scenario editor 141 is described with reference to FIG. 49.

Figure 49:
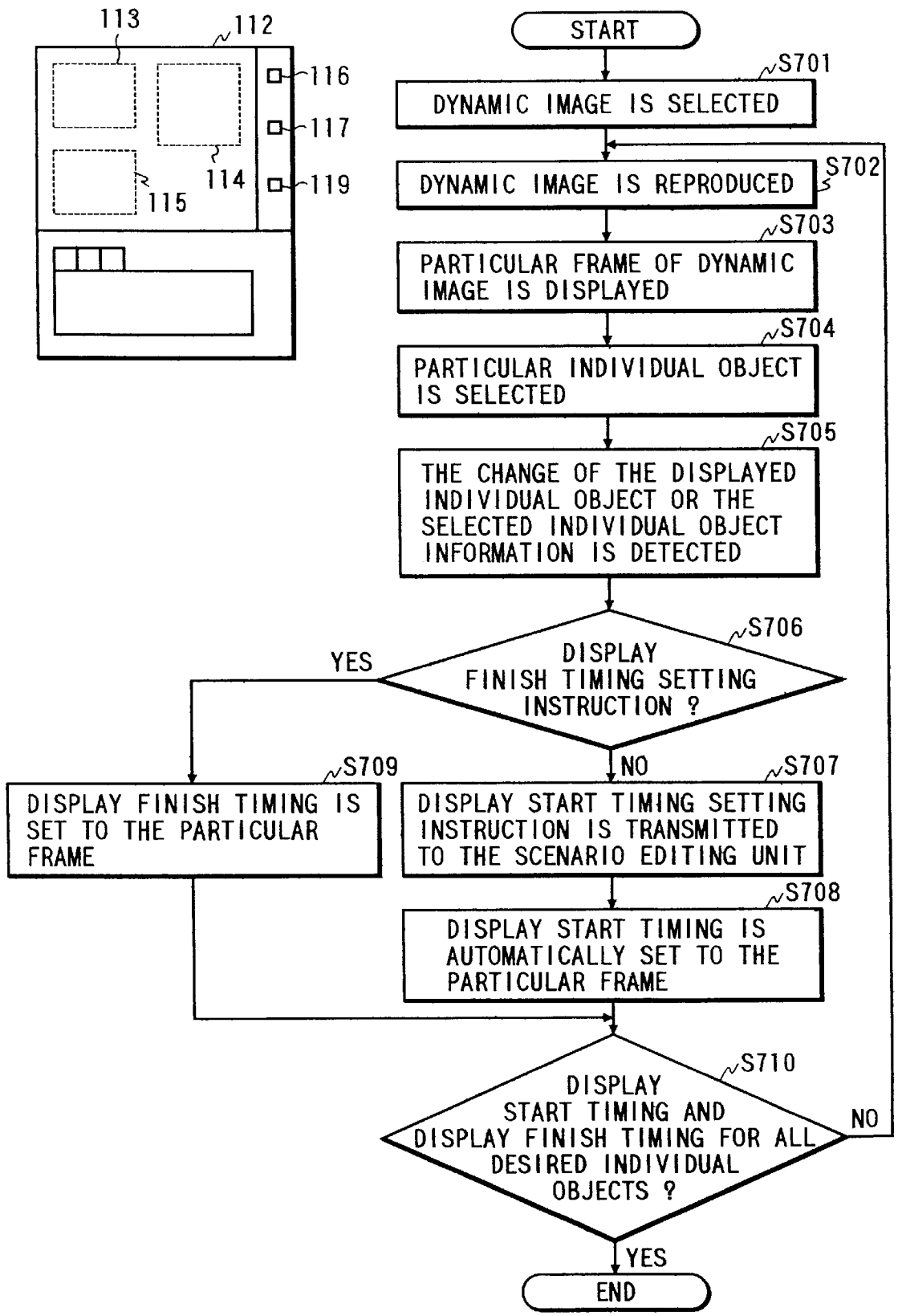
FIG. 49 is a flow chart showing a scenario editing operation performed in the hyper-video type scenario editor shown in FIG. 47.

FIG. 49 is a flow chart showing a scenario editing operation performed in the hyper-video type scenario editor 141.

As shown in FIG. 49, a user selects a dynamic image object used as a time base by inputting a dynamic image object name to the object selecting unit 105 (step S701). Thereafter, the dynamic image object is reproduced on the displaying screen 113 until a particular frame of the dynamic image object is displayed (step S702). When the particular frame of the dynamic image object is displayed on the displaying screen 113, a stopping instruction is input to the reproducing and stopping instruction receiving unit 108 to maintain the display of the particular frame (step S703). Thereafter, a particular individual object is selected in the object selecting unit 105 (step S704). Therefore, an individual object displayed on the displaying screen 114 (or 115) is changed to the particular individual object, and object information of the particular individual object is stored in the selected object information storing unit 107. Thereafter, the change of the individual object displayed on the displaying screen 114 is detected by the display start timing setting unit 143 (step S705). In other words, the change of the object information stored in the selected object information storing unit 107 is detected by the display start timing setting unit 143. Also, it is judged by the display start timing setting unit 143 whether or not a display finish timing setting instruction is received from the scenario editing instruction receiving unit 142 (step S706).

In cases where any display finish timing setting instruction is not received from the scenario editing instruction receiving unit 142 and the change of the object information is detected, it is judged by the display start timing setting unit 143 that the particular individual object is input by the user to set a display start timing to the particular individual object. Therefore, a display start timing setting instruction is transmitted from the display start timing setting unit 143 to the scenario editing unit 132 (step S707). In the scenario editing unit 132, the object information of the particular individual object stored in the selected object information storing unit 107, the layout information of the particular individual object stored in the layout information storing unit 104 and the time information stored in the time information detecting unit 110 are received, and a display start timing for the particular individual object is automatically set to the particular frame (step S708).

In contrast, in cases where a display finish timing setting instruction is received from the scenario editing instruction receiving unit 142 in the step S706, a display finish timing for the particular individual object is set to the particular frame (step S709). The steps S702 to S709 are repeated until the display start timing and the display finish timing for all desired individual objects are set. In cases where the display start timing and the display finish timing for all selected individual objects are set (step S710), the operation is finished.

Next, a scenario editing operation for editing the scenario shown in FIG. 23 in the hyper-video type scenario editor 141 is described with reference to FIG. 50.

Figure 50:
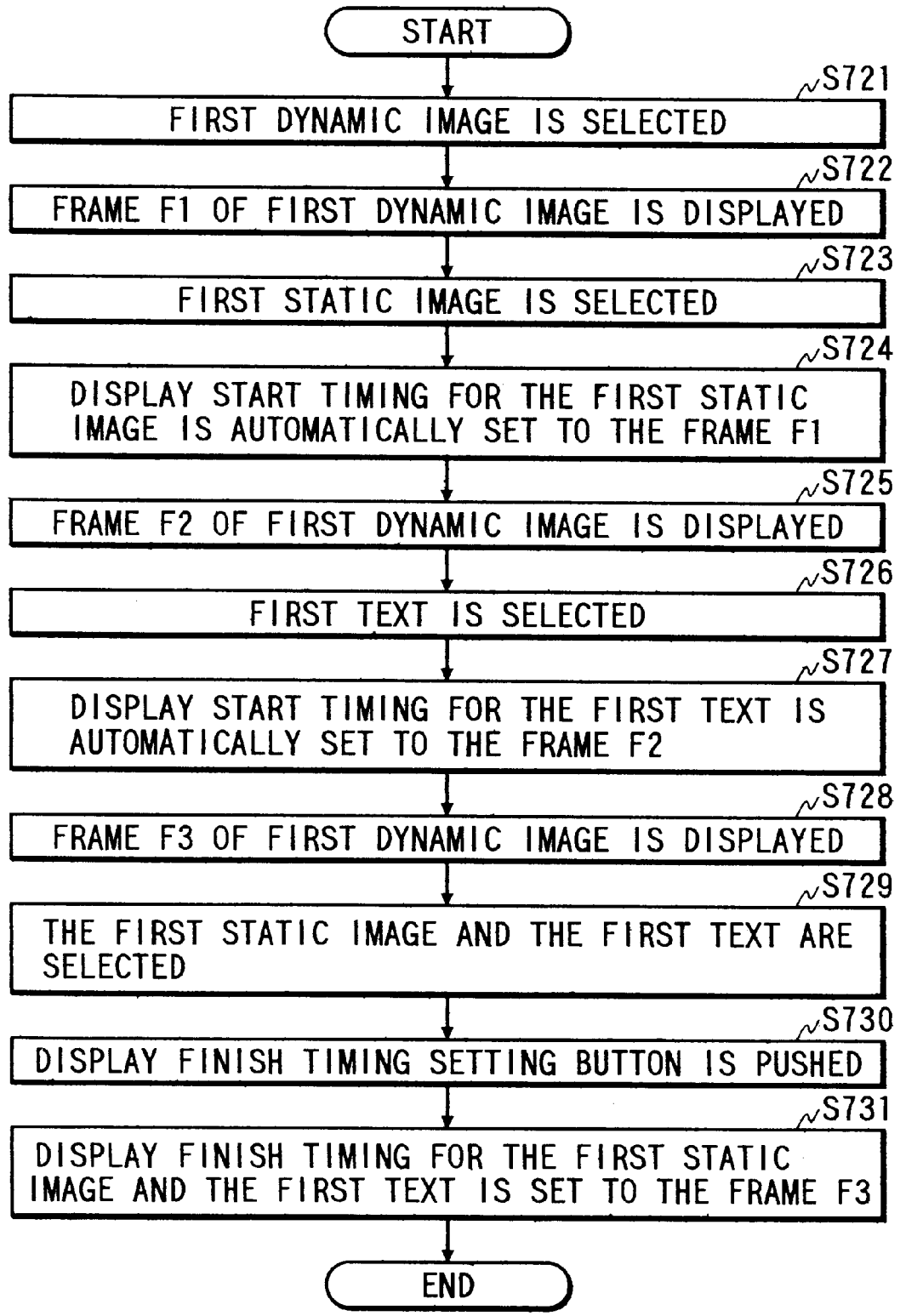
FIG. 50 is a flow chart showing a scenario editing operation for editing the scenario shown in FIG. 23 in the hyper-video type scenario editor shown in FIG. 47.

FIG. 50 is a flow chart showing a scenario editing operation for editing the scenario shown in FIG. 23 in the hyper-video type scenario editor 141.

As shown in FIG. 50, a user selects the first dynamic image by inputting the first dynamic image object name to the object selecting unit 105 (step S721). Thereafter, the first dynamic image is reproduced on the displaying screen 113, and the frame F1 of the first dynamic image is displayed (step S722). Thereafter, the first static image is selected in the object selecting unit 105 (step S723). Therefore, an individual object displayed on the displaying screen 114 is changed to the first static image, and the change of the individual object displayed on the displaying screen 114 is detected by the display start timing setting unit 143. In this case, the user does not push the display finish timing setting button 119, so that a display start timing for the first static image is automatically set to the frame F1 (step S724).

Thereafter, the reproduction of the first dynamic image is restarted, and the frame F2 of the first dynamic image is displayed on the displaying screen 113 (step S725). Thereafter, the first text is selected in the object selecting unit 105 (step S726). Therefore, an individual object displayed on the displaying screen 115 is changed to the first text, and the change of the individual object displayed on the displaying screen 114 is detected by the display start timing setting unit 143. In this case, the user does not push the display finish timing setting button 119, so that a display start timing for the first text is automatically set to the frame F2 (step S727).

Thereafter, the reproduction of the first dynamic image is restarted, and the frame F3 of the first dynamic image is displayed on the displaying screen 113 (step S728). Thereafter, the first static image and the first text are selected in the object selecting unit 105 (step S729). In this case, an individual object displayed on the displaying screen 114 is maintained to the first static image, and an individual object displayed on the displaying screen 115 is maintained to the first text. Thereafter, the user pushes the display finish timing setting button 119 (step S730), so that a display finish timing for the first static image is set to the frame F3, and a display finish timing for the first text is also set to the frame F3 (step S731).

Next, the operation performed in the display start timing setting unit 143 is described in detail with reference to FIG. 51.

Figure 51:
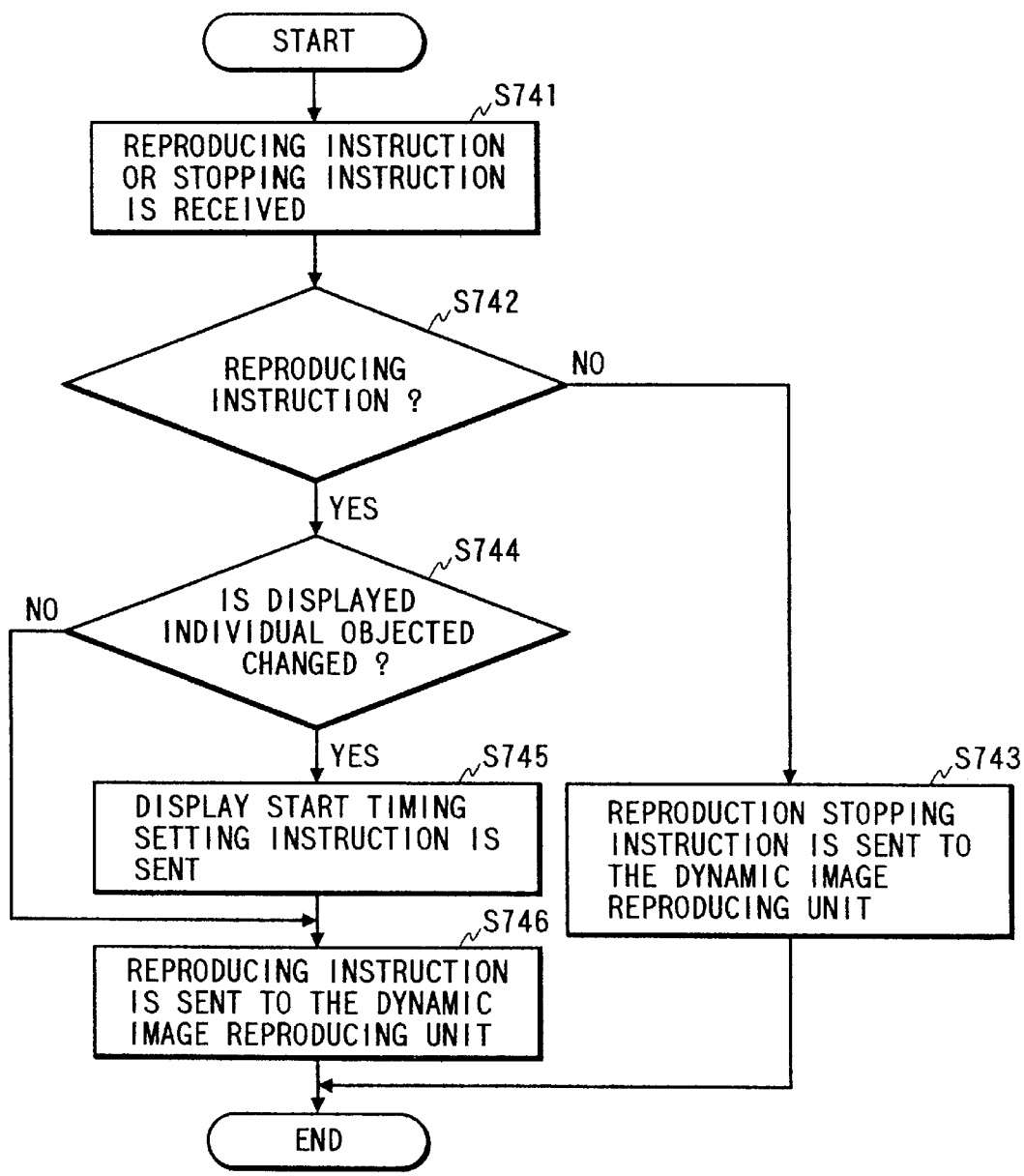
FIG. 51 is a flow chart showing the operation performed in a display start timing setting unit of the hyper-video type scenario editor shown in FIG. 47.

FIG. 51 is a flow chart showing the operation performed in the display start timing setting unit 143.

As shown in FIG. 51, when a reproducing instruction or a stopping instruction is received from the reproducing and stopping instruction receiving unit 108 (step S741), it is judged which of the reproducing instruction and the stopping instruction is received (step S742). In cases where the stopping instruction is received, a reproduction stopping instruction is sent to the dynamic image reproducing unit 133 (step S743), so that the reproduction of the dynamic image object is stopped.

In contrast, in cases where the reproducing instruction is received in the step S741, it is judged whether or not the individual object displayed on the displaying screen 114 or 115 is changed (step S744). In other words, it is judged whether or not the individual object information stored in the selected object information storing unit 107 is changed. In cases where the individual object displayed on the displaying screen 114 or 115 is changed, a display start timing setting instruction is sent to the scenario editing unit 132 (step S745), object information of a particular individual object stored in the selected object information storing unit 107 is transferred to the scenario editing unit 132, and a display start timing for the particular individual object is set to a frame indicated by the time information stored in the time information detecting unit 110. Thereafter, the reproducing instruction is sent to the dynamic image reproducing unit 133 (step S746), so that the reproduction of the dynamic image object is restarted. In contrast, in cases where the individual object displayed on the displaying screen 114 or 115 is not changed in the step S744, the procedure proceeds to the step S746.

Accordingly, because the change of the individual object displayed on the displaying screen 114 or 115 is detected by the display start timing setting unit 143, the display start timing can be automatically set for each individual object. Therefore, the scenario editing operation can be efficiently performed, and the user can perform the scenario editing operation with easy without manually performing the setting of the display start timing.

(Ninth Embodiment)

Figure 52:
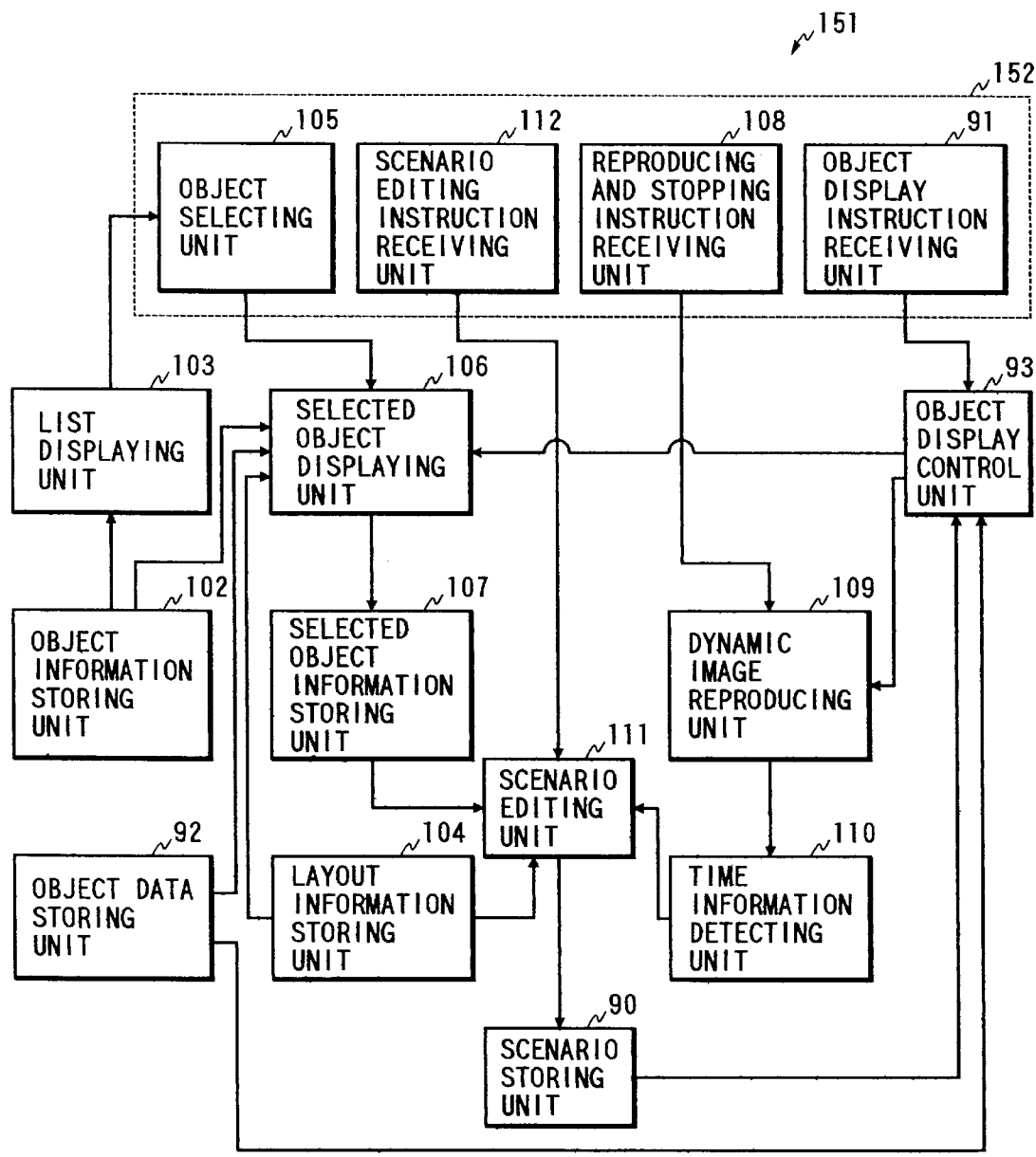
FIG. 52 is a block diagram of a hyper-video type scenario editor according to a ninth embodiment of the present invention.

FIG. 52 is a block diagram of a hyper-video type scenario editor according to a ninth embodiment of the present invention.

As shown in FIG. 52, a hyper-video type scenario editor 151 comprises the object information storing unit 102, the object data storing unit 92, the list displaying unit 103, the layout information storing unit 104, the object selecting unit 105 embodied by a touch panel 152 displayed on an image screen of the display 16, the selected object displaying unit 106, the selected object information storing unit 107, the scenario editing instruction receiving unit 112 embodied by the touch panel 152, the reproducing and stopping instruction receiving unit 108 embodied by the touch panel 152, the dynamic image reproducing unit 109, the time information detecting unit 110, the scenario editing unit 111, the scenario storing unit 90, the object display instruction receiving unit 91 embodied by the touch panel 152 and the object display control unit 93.

The reproduction button 116 and the stop button 117 of the reproducing and stopping instruction receiving unit 108, the display start timing setting button 118 and the display finish timing setting button 119 of the scenario editing instruction receiving unit 112 and the display object changing buttons 121 and the object list display screen 120 of the list displaying unit 103 are displayed on the touch panel 152. Therefore, the user can operate each of the buttons by pushing the touch panel 152.

In the above configuration, the selection of the dynamic image object and the individual objects can be performed when the user pushes the object list display screen 120 displayed on the touch panel 152. Also, various instructions can be input when the user pushes the buttons.

Accordingly, because the user can operates the hyper-video type scenario editor 151 while seeing the list of the objects and the buttons on the touch panel 152, a scenario editing operation can be performed in a form of WYSIWYG (what you see is what you get), and the scenario editing operation can be efficiently performed. In this embodiment, the touch panel 152 is used. However, it is applicable that a pen inputting apparatus, a voice inputting apparatus for recognizing a voice instruction of the user or a wireless remote control inputting apparatus be used in place of the touch panel 152.

Also, in the above embodiments, the frame is used as the time information. However, it is applicable that a time stamp attached to the dynamic image be used as the time information.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A scenario editor comprising:

object selecting means for selecting a particular dynamic image object from a plurality of dynamic image objects and selecting a particular individual object from a plurality of individual objects;

layout information storing means for storing a piece of dynamic image layout information for the dynamic image objects in common and a piece of individual object layout information for the individual objects in common;

reproducing and stopping instruction receiving means for receiving a reproducing instruction and a stopping instruction;

dynamic image reproducing means for reproducing the particular dynamic image object selected by the object selecting means frame by frame according to the reproducing instruction received by the reproducing and stopping instruction receiving means and stopping the reproduction of the particular dynamic image object at a particular frame according to the stopping instruction received by the reproducing and stopping instruction receiving means;

time information storing means for storing the particular frame of the particular dynamic image object obtained by the dynamic image reproducing means;

selected object displaying means for displaying the particular dynamic image object and the particular individual object selected by the object selecting means, displaying the particular dynamic image object frame by frame according to the reproducing instruction received by the reproducing and stopping instruction receiving means and maintaining the display of the particular frame of the particular dynamic image object according to the stopping instruction received by the reproducing and stopping instruction receiving means;

scenario editing instruction receiving means for receiving a display start timing or a display finish timing;

scenario editing means for assigning the particular individual object selected by the object selecting means to the particular dynamic image object selected by the object selecting means according to the dynamic image layout information and the individual object layout information stored in the layout information storing means to start the display of the particular individual object at the particular frame of the particular dynamic image in cases where the display start timing is received by the scenario editing instruction receiving means and to finish the display of the particular individual object at the particular frame of the particular dynamic image in cases where the display finish timing is received by the scenario editing instruction receiving means and obtaining a time relationship between the particular dynamic image object and the particular individual object assigned to the particular dynamic image object as an edited scenario; and display start timing setting means for detecting whether or not an individual object displayed by the selected object displaying means is changed to a second particular individual object during the display of a second particular frame of the particular dynamic image maintained by the dynamic image reproducing means and outputting a display start timing for the second particular individual object to the scenario editing means regardless of whether another display start timing for the second particular individual object is received by the scenario editing instruction receiving means in cases where the display of the current individual object is detected, the second particular individual object being assigned to the particular dynamic image object by the scenario editing means to start the display of the second particular individual object at the second particular frame.

2. A scenario editor according to claim 1, further comprising:

selected object information storing means for storing pieces of object information for the particular dynamic image object and the particular individual object selected by the object selecting means, each piece of object information being composed of an object name, an object identification number, a window identification number for identifying a window used to display a corresponding particular dynamic image or individual object and an attribute indicating a type of the corresponding particular dynamic image or individual object, and the pieces of object information being taken in the scenario edited by the scenario editing means.

3. A scenario editor according to claim 1, further comprising:

object display instruction receiving means for receiving an object display instruction; and object display controlling means for controlling the selected object displaying means according to the object display instruction received by the object display instruction receiving means to display the particular dynamic image object and the particular individual object according to the scenario edited by the scenario editing means.

4. A scenario editor according to claim 1, further comprising:

object information storing means for storing a plurality of representative images for the dynamic image objects and the individual objects;

list displaying means for displaying the representative images stored in the object information storing means in a list form, the particular dynamic image object and the particular individual object selected by the object selecting means being specified by the user while the user refers the representative images displayed by the list displaying means.

5. A scenario editor according to claim 1 in which the individual objects are classified into one or more static image objects and one or more text objects, the individual object layout information stored in the layout information storing means is classified into a piece of static image object layout information and a piece of text object layout information, the static image object layout information is in common to the static image objects, and the text object layout information is in common to the text objects.

6. A scenario editor according to claim 1 in which a returning instruction is received by the reproducing and stopping instruction receiving means, the reproduction of the particular dynamic image is returned to a current frame by the dynamic image reproducing means according to the returning instruction, a second display finish timing is received by the scenario editing instruction receiving means, and the scenario in which the display of the particular individual object assigned to the particular dynamic image object by the scenario editing means is finished at the particular frame of the particular dynamic image object is altered by the scenario editing means to a scenario in which the display of the particular individual object is finished at the current frame of the particular dynamic image object.

7. A scenario editor according to claim 1 in which a current individual object is selected by the object selecting means, a returning instruction is received by the reproducing and stopping instruction receiving means, the reproduction of the particular dynamic image is returned to a current frame prior to the particular frame by the dynamic image reproducing means according to the returning instruction, a second display start timing is received by the scenario editing instruction receiving means, and the scenario in which the display of the particular individual object assigned to the particular dynamic image object by the scenario editing means is started at the particular frame is altered by the scenario editing means to a scenario in which the display of the particular individual object is started at the particular frame, the display of the current individual object is started at the current frame and the display of the current individual object is finished at the particular frame.

8. A scenario editor according to claim 1 in which a current individual object is selected by the object selecting means, a returning instruction is received by the reproducing and stopping instruction receiving means, the reproduction of the particular dynamic image is returned to a current frame by the dynamic image reproducing means according to the returning instruction, a second display start timing is received by the scenario editing instruction receiving means, and the scenario in which the display of the particular individual object assigned to the particular dynamic image object by the scenario editing means is started at the particular frame prior to the current frame is altered by the scenario editing means to a scenario in which the display of the particular individual object is started at the particular frame, the display of the particular individual object is finished at the current frame and the display of the current individual object is started at the current frame.

9. A scenario editor comprising:

object selecting means, embodied by a touch panel, for selecting a particular dynamic image object from a plurality of dynamic image objects and selecting a particular individual object from a plurality of individual objects;

layout information storing means for storing a piece of dynamic image layout information for the dynamic image objects in common and a piece of individual object layout information for the individual objects in common;

reproducing and stopping instruction receiving means, embodied by the touch panel, for receiving a reproducing instruction and a stopping instruction;

dynamic image reproducing means for reproducing the particular dynamic image object selected by the object selecting means frame by frame according to the reproducing instruction received by the reproducing and stopping instruction receiving means and stopping the reproduction of the particular dynamic image object at a particular frame according to the stopping instruction received by the reproducing and stopping instruction receiving means;

time information storing means for storing the particular frame of the particular dynamic image object obtained by the dynamic image reproducing means;

selected object displaying means for displaying the particular dynamic image object and the particular individual object selected by the object selecting means, displaying the particular dynamic image object frame by frame according to the reproducing instruction received by the reproducing and stopping instruction receiving means and maintaining the display of the particular frame of the particular dynamic image object according to the stopping instruction received by the reproducing and stopping instruction receiving means;

scenario editing instruction receiving means, embodied by the touch panel, for receiving a display start timing or a display finish timing; and scenario editing means for assigning the particular individual object selected by the object selecting means to the particular dynamic image object selected by the object selecting means according to the dynamic image layout information and the individual object layout information stored in the layout information storing means to start the display of the particular individual object at the particular frame of the particular dynamic image in cases where the display start timing is received by the scenario editing instruction receiving means and to finish the display of the particular individual object at the particular frame of the particular dynamic image in cases where the display finish timing is received by the scenario editing instruction receiving means and obtaining a time relationship between the particular dynamic image object and the particular individual objects assigned to the particular dynamic image object as an edited scenario.

10. A scenario editor according to claim 9, further comprising:

selected object information storing means for storing pieces of object information for the particular dynamic image object and the particular individual object selected by the object selecting means, each piece of object information being composed of an object name, an object identification number, a window identification number for identifying a window used to display a corresponding particular dynamic image or individual object and an attribute indicating a type of the corresponding particular dynamic image or individual object, and the pieces of object information being taken in the scenario edited by the scenario editing means.

11. A scenario editor according to claim 9, further comprising:

object display instruction receiving means for receiving an object display instruction; and object display controlling means for controlling the selected object displaying means according to the object display instruction received by the object display instruction receiving means to display the particular dynamic image object and the particular individual object according to the scenario edited by the scenario editing means.

12. A scenario editor according to claim 9, further comprising:

object information storing means for storing a plurality of representative images for the dynamic image objects and the individual objects;

list displaying means for displaying the representative images stored in the object information storing means in a list form, the particular dynamic image object and the particular individual object selected by the object selecting means being specified by the user while the user refers the representative images displayed by the list displaying means.

13. A scenario editor according to claim 9 in which the individual objects are classified into one or more static image objects and one or ore text objects, the individual object layout information stored in the layout information storing means is classified into a piece of static image object layout information and a piece of text object layout information, the static image object layout information is in common to the static image objects, and the text object layout information is in common to the text objects.

14. A scenario editor according to claim 9 in which a returning instruction is received by the reproducing and stopping instruction receiving means, the reproduction of the particular dynamic image is returned to a current frame by the dynamic image reproducing means according to the returning instruction, a second display finish timing is received by the scenario editing instruction receiving means, and the scenario in which the display of the particular individual object assigned to the particular dynamic image object by the scenario editing means is finished at the particular frame of the particular dynamic image object is altered by the scenario editing means to a scenario in which the display of the particular individual object is finished at the current frame of the particular dynamic image object.

15. A scenario editor according to claim 9 in which a current individual object is selected by the object selecting means, a returning instruction is received by the reproducing and stopping instruction receiving means, the reproduction of the particular dynamic image is returned to a current frame prior to the particular frame by the dynamic image reproducing means according to the returning instruction, a second display start timing is received by the scenario editing instruction receiving means, and the scenario in which the display of the particular individual object assigned to the particular dynamic image object by the scenario editing means is started at the particular frame is altered by the scenario editing means to a scenario in which the display of the particular individual object is started at the particular frame, the display of the current individual object is started at the current frame and the display of the current individual object is finished at the particular frame.

16. A scenario editor according to claim 9 in which a current individual object is selected by the object selecting means, a returning instruction is received by the reproducing and stopping instruction receiving means, the reproduction of the particular dynamic image is returned to a current frame by the dynamic image reproducing means according to the returning instruction, a second display start timing is received by the scenario editing instruction receiving means, and the scenario in which the display of the particular individual object assigned to the particular dynamic image object by the scenario editing means is started at the particular frame prior to the current frame is altered by the scenario editing means to a scenario in which the display of the particular individual object is started at the particular frame, the display of the particular individual object is finished at the current frame and the display of the current individual object is started at the current frame.

* * * * *